US010029819B2

(12) United States Patent
Storteboom et al.

(10) Patent No.: US 10,029,819 B2
(45) Date of Patent: Jul. 24, 2018

(54) PLASTIC PALLET WITH CENTERLINE MARKINGS AND ASSOCIATED METHODS

(71) Applicant: CHEP Technology Pty Limited, Sydney (AU)

(72) Inventors: John Thomas Storteboom, Roswell, GA (US); Jeffrey Ryan Chapin, San Francisco, CA (US); Gregory Wolos, Cambridge, MA (US); Kenneth Brandt, Umalas (ID); Daniel J. Lantz, Orlando, FL (US); Oivind Brockmeier, Medford, MA (US); Brandon Michael D'Emidio, Roswell, GA (US)

(73) Assignee: CHEP Technology Pty Limited, Sydney (AU)

( * ) Notice: Subject to any disclaimer, the term of this patent is extended or adjusted under 35 U.S.C. 154(b) by 0 days.

(21) Appl. No.: 15/357,253

(22) Filed: Nov. 21, 2016

(65) Prior Publication Data
US 2018/0141706 A1    May 24, 2018

(51) Int. Cl.
*B65D 19/00*   (2006.01)
*B65D 19/38*   (2006.01)

(52) U.S. Cl.
CPC .......... *B65D 19/38* (2013.01); *B65D 19/0012* (2013.01); *B65D 19/385* (2013.01); *B65D 2519/00034* (2013.01); *B65D 2519/00069* (2013.01); *B65D 2519/00104* (2013.01); *B65D 2519/00273* (2013.01); *B65D 2519/00288* (2013.01); *B65D 2519/00318* (2013.01); *B65D 2519/00378* (2013.01); *B65D 2519/00567* (2013.01); *B65D 2519/00796* (2013.01)

(58) Field of Classification Search
CPC .............................. B65D 19/38; B65D 19/385
See application file for complete search history.

(56) References Cited

U.S. PATENT DOCUMENTS

| | | | | |
|---|---|---|---|---|
| 4,843,976 A | * | 7/1989 | Pigott | B65D 19/0012 108/56.1 |
| 5,413,052 A | | 5/1995 | Breezer et al. | |
| 5,445,084 A | * | 8/1995 | Durand | B65D 19/0026 108/56.3 |
| 5,791,261 A | * | 8/1998 | John | B65D 19/0018 108/56.3 |
| 8,651,028 B2 | | 2/2014 | Storteboom et al. | |
| 2010/0229764 A1 | * | 9/2010 | Ingham | B65D 19/0095 108/51.3 |

(Continued)

OTHER PUBLICATIONS

U.S. Appl. No. 15/357,220, filed Nov. 21, 2016.
(Continued)

*Primary Examiner* — Daniel J Rohrhoff
(74) *Attorney, Agent, or Firm* — Allen, Dyer, Doppelt & Gilchrist, P. A.

(57) ABSTRACT

A pallet includes a top deck having a rectangular shape, a bottom deck having a rectangular shape, and spaced apart corner support blocks and spaced apart intermediate support blocks coupled between the top and bottom decks and forming a gap therebetween for receiving a lifting member. Centerline markings are carried by at least one of the top deck, the bottom deck, and the corner and intermediate support blocks so as to provide a visual aid to an operator of the lifting member.

21 Claims, 23 Drawing Sheets

(56) References Cited

U.S. PATENT DOCUMENTS

2013/0145971 A1* 6/2013 Federl ............... B65D 19/0059
                                                      108/57.25
2013/0152832 A1  6/2013 Storteboom et al.
2015/0274356 A1* 10/2015 Andria .................. B65B 13/20
                                                      206/326
2015/0274359 A1  10/2015 Linares

OTHER PUBLICATIONS

U.S. Appl. No. 15/357,147, filed Nov. 21, 2016.
U.S. Appl. No. 15/357,281, filed Nov. 21, 2015.
U.S. Appl. No. 15/357,330, filed Nov. 21, 2016.

* cited by examiner

US 10,029,819 B2

PLASTIC PALLET WITH CENTERLINE MARKINGS AND ASSOCIATED METHODS

FIELD OF THE INVENTION

The present invention relates to the field of pallets, and more particularly, to a plastic pallet for use with forklift equipment.

BACKGROUND OF THE INVENTION

Pallets are customarily used to transport and store goods. A pallet typically includes a top deck deck and a bottom deck separated by support blocks. Pallets have traditionally been formed of wood. While advantageous in terms of cost, wood pallets have many disadvantages. For example, they are subject to breakage and are therefore reusable only over a short period of time. Wooden pallets are also difficult to maintain in a sanitary condition, thereby limiting their usability in applications where sanitation is important, such as in food handling applications.

With growth of the plastics industry a wide variety of plastics have been investigated to determine their suitability for use in producing pallets. Plastic pallets can easily be molded and are stronger and lighter weight than wooden pallets. They can also be made with recyclable materials.

Plastic pallets are generally more durable than wooden pallets. Nonetheless, the support blocks separating the top and bottom decks are subjected to the most intense wear of any part on the pallet since they come into repeated contact with the sharp metal tines of a forklift or pallet jack.

In addition, if the tines of the pallet jack are inserted too far between the top and bottom decks such that the wheels of the pallet jack are resting on the bottom deck, then the top deck becomes separated from the bottom deck when the tines are lifted. The resulting damage from the top deck being separated from the bottom deck requires the top deck to be replaced, and if the damage is too extensive, then the entire pallet is replaced.

If only the support blocks are damaged by the pallet jack, then they may be replaced at a cost far less than replacing the entire pallet. For example, U.S. Pat. No. 5,413,052 discloses a plastic pallet having a top deck and a bottom deck, with replaceable support blocks therebetween. The support blocks include octagonal posts having support member walls positioned beneath reinforced portions of the top deck. The posts also have a sleeve with a central bolt hole parallel to the support member walls. The bottom deck receives the support blocks in recessed pockets. Plastic bolts are inserted through the top deck, each post, and the bottom deck. Plastic T-nuts are used for holding the bolts in place.

In U.S. Pat. No. 4,843,976 a plastic pallet includes identical top and bottom decks interconnected by support blocks. Each support block includes a central core and a surrounding sleeve interconnected by spokes. The core has flexible tabs that extend beyond opposite ends of the sleeve and lock onto the top and bottom decks.

The plastic pallet disclosed in U.S. Pat. No. 5,791,261 also discloses the use of flexible tabs for holding the top and bottom decks together. In particular, the plastic pallet includes support blocks between the top and bottom decks, and upper and lower snap-lock elements extend from the respective top and bottom decks through the support blocks for inter-locking with one another.

While plastic pallets offer several advantages over wood pallets, there is still a demand to increase durability and strength of plastic pallets.

SUMMARY OF THE INVENTION

A pallet includes a top deck having having a rectangular shape, a bottom deck having having a rectangular shape, and a plurality of spaced apart corner support blocks and a plurality of intermediate support blocks coupled between the top and bottom decks and forming a gap therebetween for receiving a lifting member. Centerline markings may be carried by at least one of the top deck, the bottom deck, and the plurality of corner and intermediate support blocks.

The centerline markings advantageously provide a visual aid to an operator of a forklift, for example, to better see the gaps or openings between the top and bottom decks of the plastic pallet. The visual aids on the pallet thus help to reduce impacts with the tines of the forklift.

Each centerline marking may comprise a reflective material, a taped centerline marking, a painted centerline marking, or a pad printed centerline marking, for example.

Alternatively, each centerline marking may comprise pre-molded plastic having a first color surrounded by molded plastic having a second color, with the first color being lighter than the second color.

Each centerline marking may be recessed with respect to a mounting surface on at least one of the top deck, the bottom deck, and the plurality of intermediate and corner support blocks having the centerline markings.

The top and bottom decks each have outer exposed edges, and the centerline markings may comprise centerline markings on the outer edges, with the centerline markings extending on the outer edges between the corner support blocks and the intermediate support blocks. Each centerline marking extending between a corner support block and an intermediate support block may include a gap corresponding to a center between the corner support block and the intermediate support block.

Each corner and intermediate support block may comprise first and second pairs of opposing exposed support block side surfaces, and a respective exposed support block corner surface extending between an exposed support block side surface in the first pair of exposed support block side surfaces and an adjacent exposed support block side surface in the second pair of exposed support block side surfaces. The centerline markings may comprise a centerline marking carried by each exposed support block corner surface.

Each corner and intermediate support block may comprise first and second pairs of opposing exposed support block side surfaces, with each exposed support block side surface having a pocket formed therein for receiving an end of the lifting member so as to allow the pallet to be spun around.

For each exposed support block side surface that is aligned with an adjacent outer edge of the top and bottom decks, the corresponding pocket in the exposed support block side surface may be recessed from the adjacent outer edge.

Each exposed support block side surface block having the pocket formed therein may include an outer exposed wall surrounding the pocket, and wherein the pocket may include a bottom surface and adjacent side surfaces, with the adjacent side surfaces being non-orthogonal with respect to the outer exposed wall and the bottom surface.

Another aspect is directed to a method for making a pallet as described above. The method may comprise forming a top deck having a rectangular shape, forming a bottom deck having a rectangular shape, and coupling a plurality of spaced apart corner support blocks and a plurality of intermediate support blocks between the top and bottom decks and forming a gap therebetween for receiving a lifting member. Centerline markings are attached to at least one of the top deck, the bottom deck, and the plurality of corner and intermediate support blocks so as to provide a visual aid to an operator of the lifting member.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
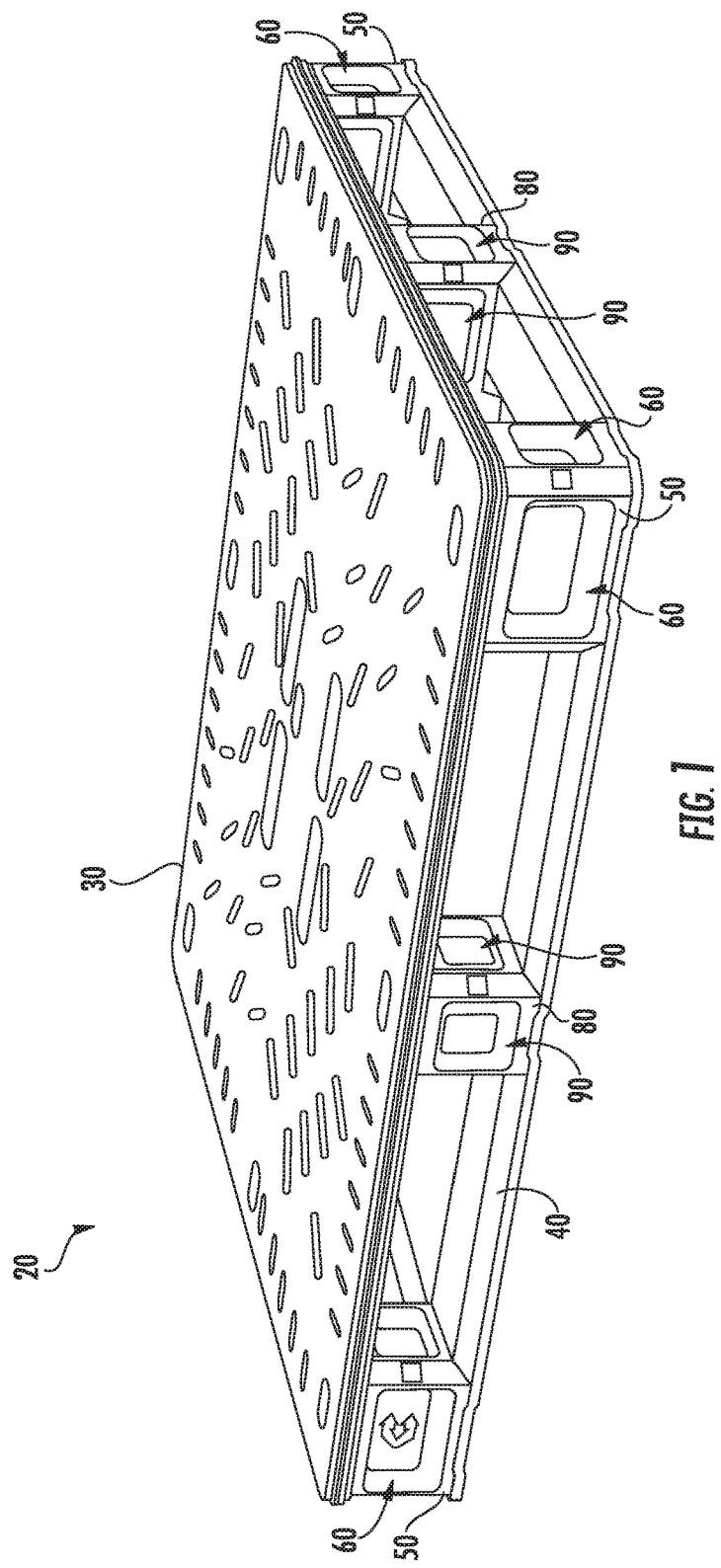
FIG. 1 is a perspective view of a plastic pallet with support blocks having pockets for pin wheeling in accordance with the present invention.
Figure 2:
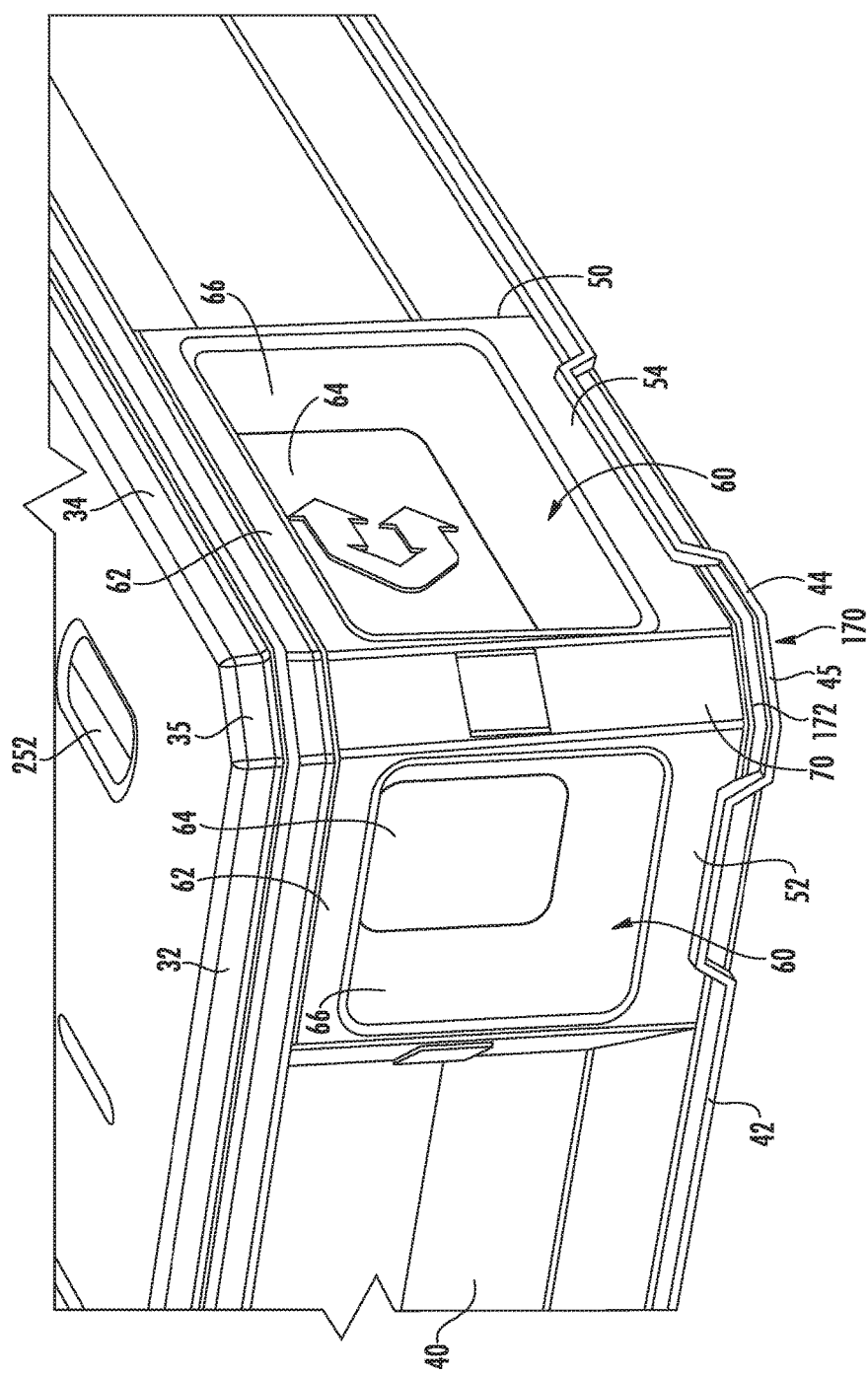
FIG. 2 is an enlarged perspective view of a corner support block shown in FIG. 1.

Referring initially to FIGS. 1-2, a plastic pallet 20 includes a top deck 30 having a rectangular shape, a bottom deck 40 having a rectangular shape, and a plurality of spaced apart corner support blocks 50 coupled between corners of the top and bottom decks and forming a gap therebetween for receiving a lifting member. The lifting member may be the metal tines of a forklift or pallet jack. The top deck 30 is also known as the cargo layer, and the bottom deck 40 is also known as the base layer. The plastic pallet 20 further includes intermediate support blocks 80 coupled between mid-sections of the top and bottom decks 30, 40.

Each corner support block 50 includes a pair of exposed support block side surfaces 52, 54 aligned with a respective corner of the pallet 20. Each exposed support block side surface 52, 54 has a pocket 60 formed therein for receiving an end of the lifting member so as to allow the pallet 20 to be spun around when on the ground.

The remaining exposed support block side surfaces of each corner support block 50 also have respective pockets 60 formed therein. Consequently, the exposed sides of each corner support block 50 are symmetrical with respect to their opposing sides. In the illustrated embodiment, each corner support block 50 is rectangular shape, wherein the exposed support block side surface 54 is longer in length than the other exposed support block side surface 52. In other embodiments, the exposed support block side surfaces 52, 54 are equal in length so that the corner support block 50 is square shaped.

The plastic pallet 20 may have dimensions of 40 inches by 48 inches, for example. Sometimes the load on the pallets 20 may overhang the sides of the pallets. When such pallets 20 are loaded onto a 96 inch wide trailer, for example, some of the pallets 20 will need to be turned or rotated 90 degrees by the forklift operator so that two pallets will fit next to each other.

Rotating a pallet 20 by the forklift operator is known as pin wheeling. To pin wheel a pallet 20, the operator of the forklift uses one of the sharp metal tines of the forklift to contact one of the pockets 60 of an exposed side surface of a corner support block 50. The pocket 60 advantageously allows the tine to grip the pallet for it to be spun 90 degrees. Without the pocket, the tine may dig into one of the exposed support block side surfaces 52, 54 causing damage to the corner support block 50.

Each pocket 60 is recessed from respective adjacent outer edges 32, 34 of the top deck 30 and from respective adjacent outer edges 42, 44 of the bottom deck 40. The exposed support block side surfaces 52, 54 of each corner support block 50 having the pocket 60 formed therein include an outer exposed wall 62 surrounding the pocket.

The pocket 60 includes a bottom surface 64 and adjacent side surfaces 66, with the adjacent side surfaces being non-orthogonal or angled with respect to the outer exposed wall 62 and the bottom surface. Alternatively, the adjacent side surfaces 66 may be orthogonal or perpendicular with respect to the outer exposed wall 62 and the bottom surface 64.

Each corner support block 50 comprises an exposed support block corner surface 70 extending between the pair of exposed support block side surfaces 52, 54. Each corner support block 50 thus has an octagon shape. The exposed support block corner surface 70 may be straight or rounded to match the corresponding exposed corner surfaces 35, 45 in the top and bottom decks 30, 40.

Figure 3:
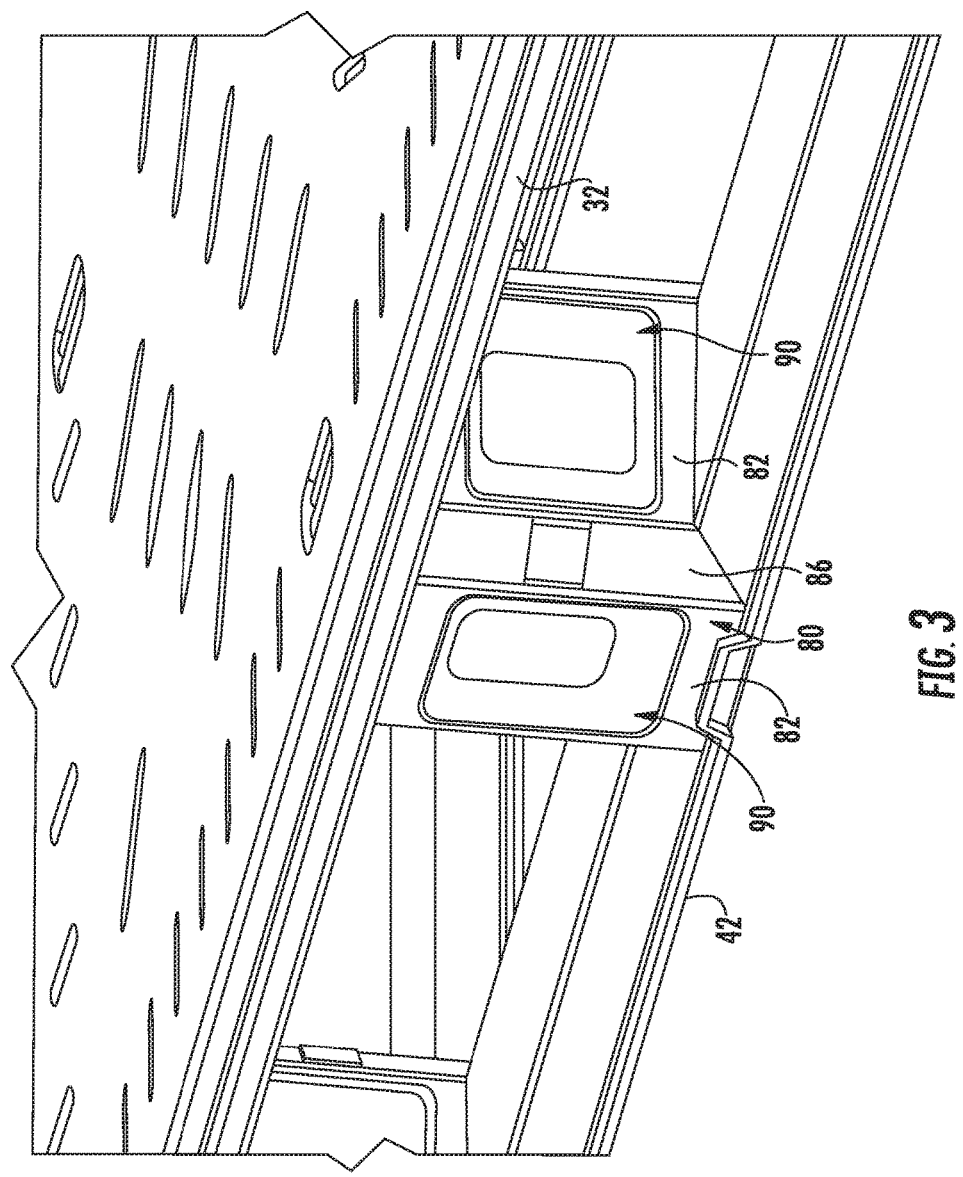
FIG. 3 is an enlarged perspective view of an intermediate support block shown in FIG. 1.

Similarly, each intermediate support block 80 includes a plurality of exposed support block side surfaces 82, with each exposed support block side surface having a having a pocket 90 formed therein, as illustrated in FIG. 3. One of the exposed support block side surfaces 82 is aligned with the outer edges 32, 34 of the top and bottom decks 30, 40.

Each intermediate support block 80 also includes an exposed support block corner surface 86 extending between any two adjacent pairs of exposed support block side surfaces 82. The pockets 90 in the intermediate support block 80 are similar to the pockets 60 in the corner support block 50.

Figure 4:
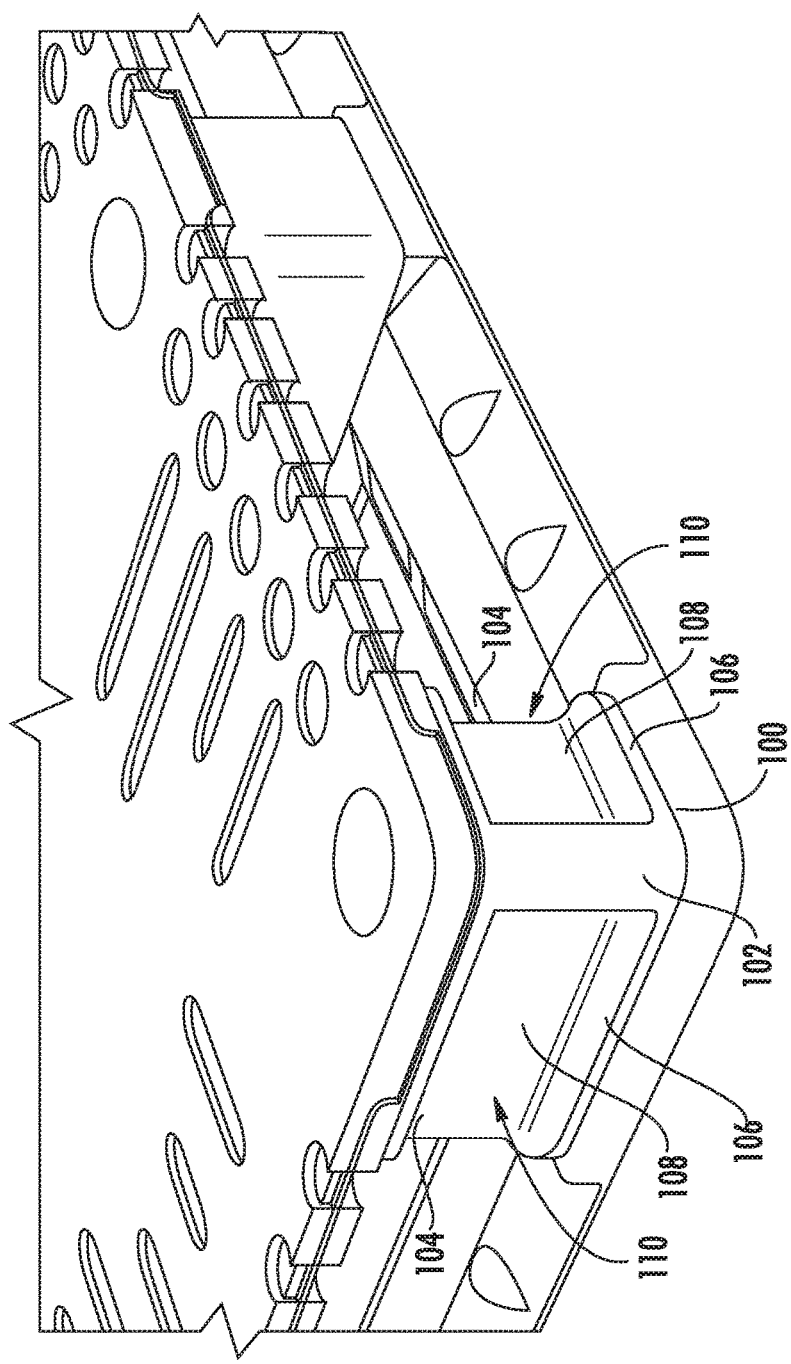
FIGS. 4-6 are perspective views of different embodiments of the corner support blocks shown in FIG. 1.

The corner and intermediate support blocks 50, 80 with pockets 60, 90 for pin wheeling are not limited to the embodiment shown in FIGS. 1-3. The corner support block 100 illustrated in FIG. 4, for example, is defined by a single column 102 aligned with the corner of the pallet, and with an upper ledge 104 and a lower ledge 106 extending from each side of the single column around a perimeter of the corner support block 100. The exposed support block side surfaces 108 extending between the upper and lower ledges 104, 106 form the pocket 110. Transitions between the single column 102 and the exposed support block side surfaces 108 and the upper and lower ledges 104, 106 are curved.

Figure 5:
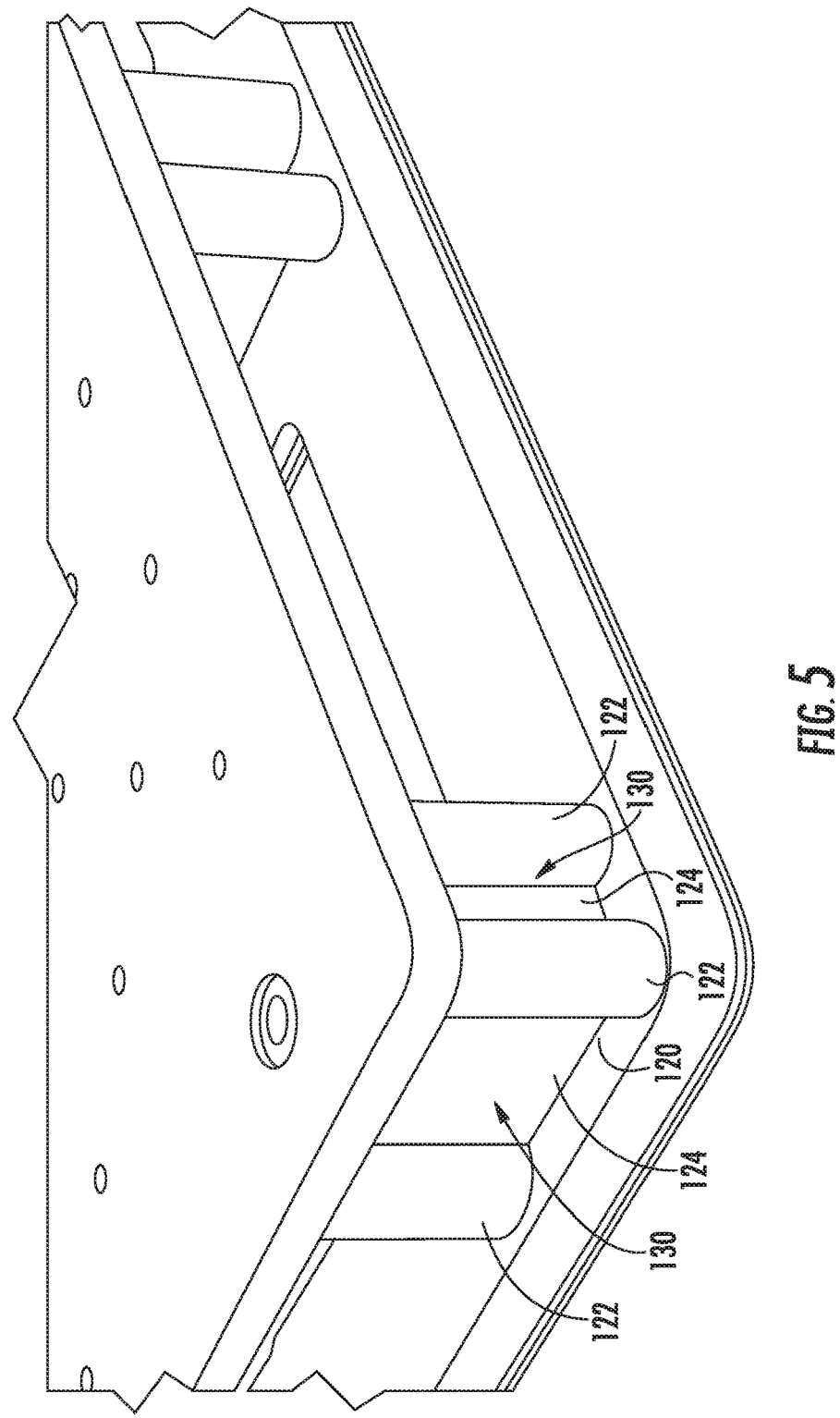

Referring now to FIG. 5, the corner support block 120 is defined by four columns 122 with an exposed support block side surface 124 extending between any two adjacent columns. One of the columns 122 is aligned with the corner of the pallet. Each exposed support block side surface 124 forms a pocket 130 with respect to its adjacent columns 122. Transitions between each column 122 and the exposed support block side surfaces 124 are curved.

Figure 6:
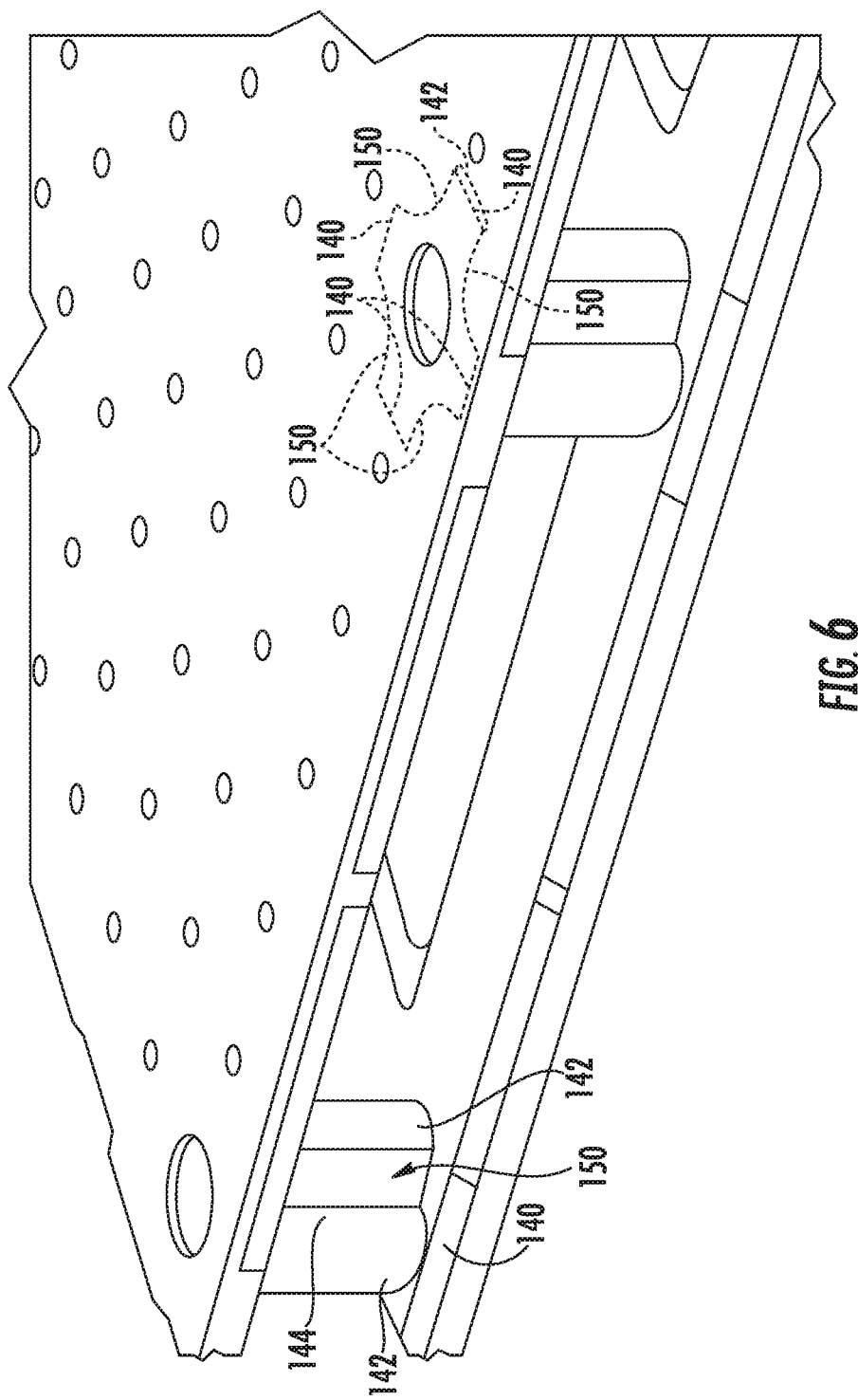

In yet another embodiment, each corner support block 140 is defined by four columns 142 with an exposed support block side surface 144 extending between any two adjacent columns, as illustrated in FIG. 6. Each exposed support block side surface 144 forms a pocket 150 with respect to its adjacent columns 142. In this embodiment, however, the corner support block 140 is positioned so that a pocket 150 is aligned with the corner of the pallet. In addition, the corner support block 140 is square shaped so that the transitions between each column 142 and the exposed support block side surfaces 144 are significantly curved.

Figure 7:
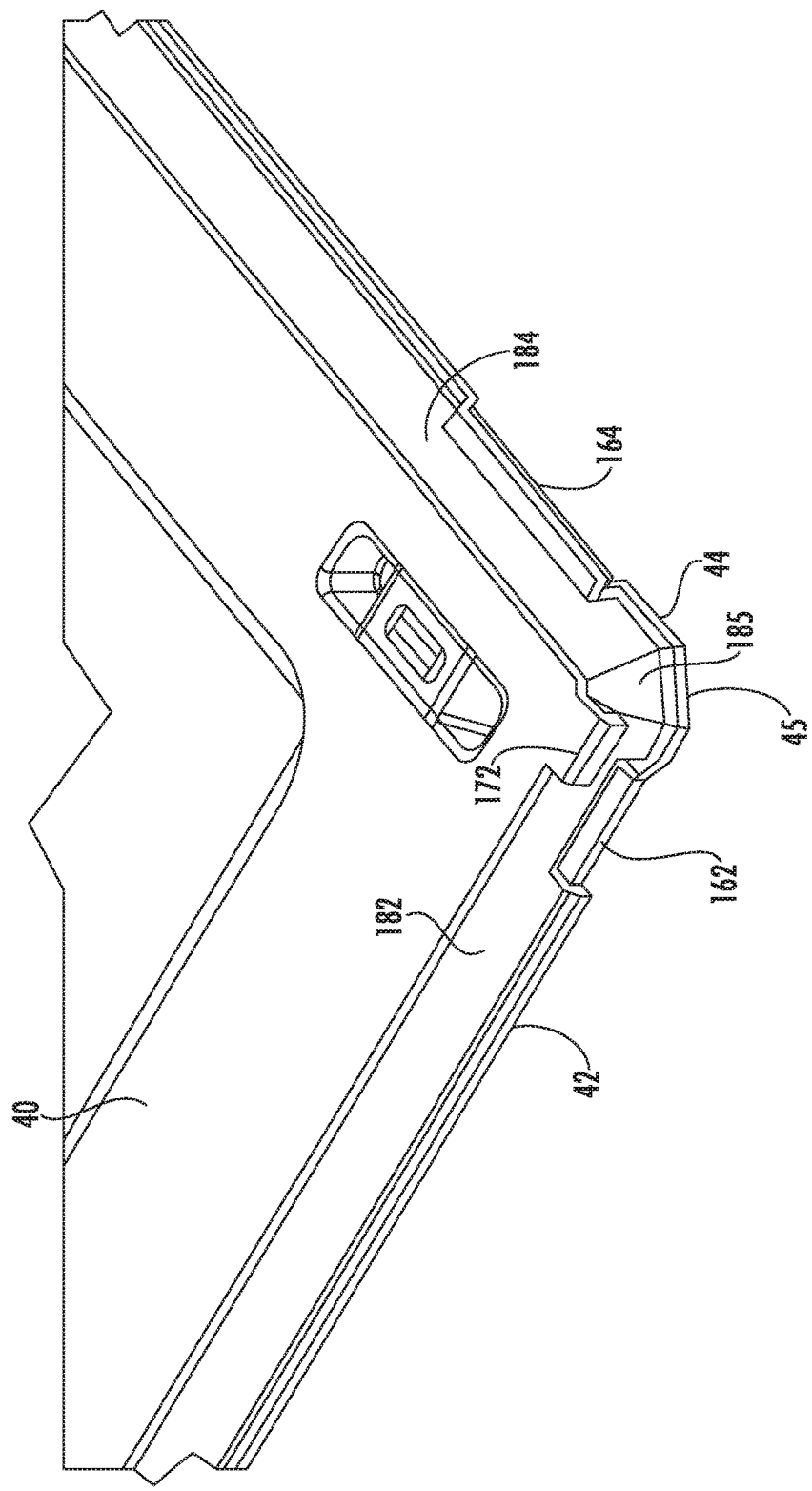
FIG. 7 is an enlarged perspective view of a corner of the bottom deck shown in FIG. 1.
Figure 8:
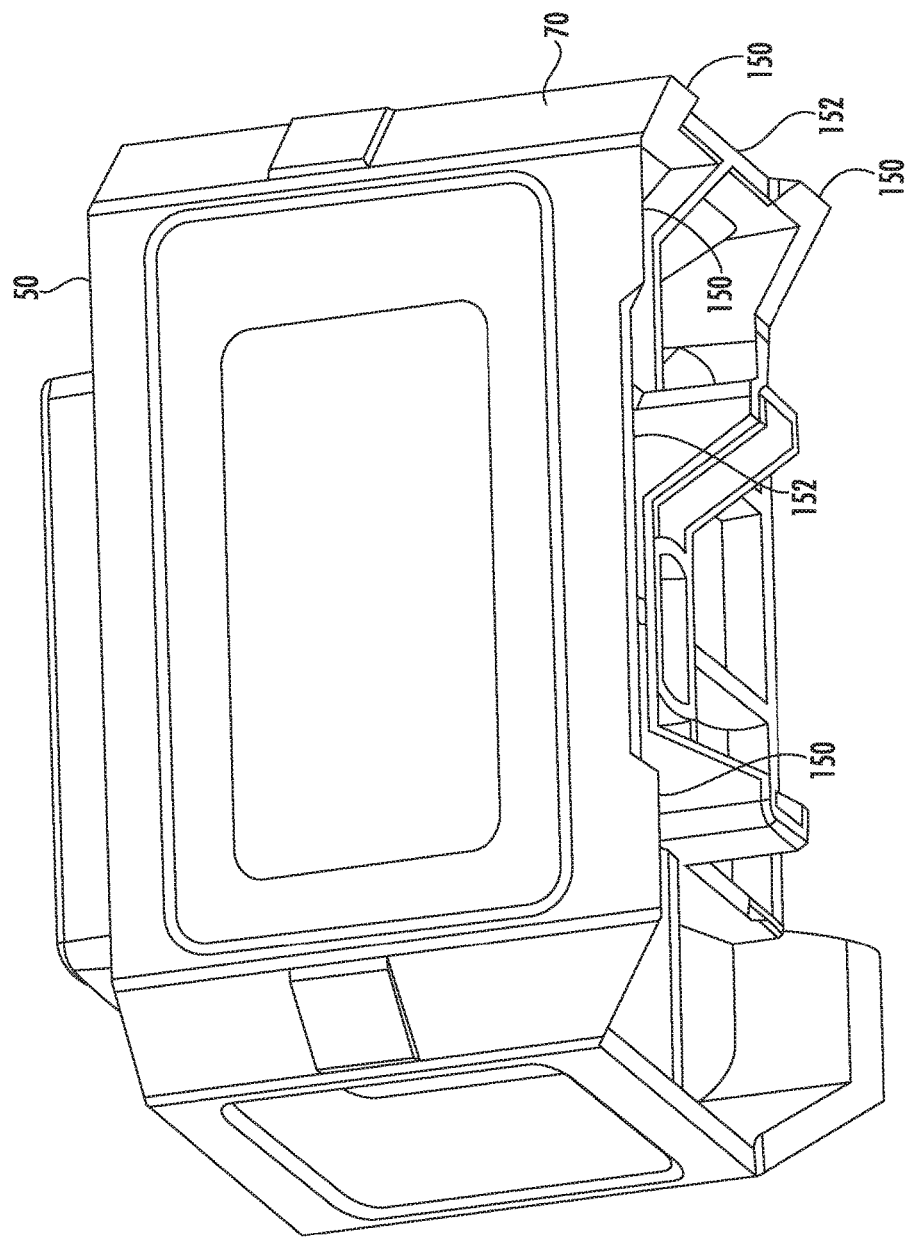
FIG. 8 is an enlarged perspective view of a corner support block shown in FIG. 1.

Referring now to FIGS. 2, 7 and 8, another aspect of the illustrated pallet 20 is directed to each corner support block 50 having a corner guard or block tooth 170 to protect a corner of the bottom deck 40 from impact with the tines of a forklift or pallet jack.

As discussed above, each corner of the bottom deck 40 has a pair of exposed bottom deck side surfaces 42, 44, and an exposed bottom deck corner surface 45 extending between the pair of exposed bottom deck side surfaces.

Each exposed support block side surface 52, 54 that is aligned with a respective corner has lower end sections 150 and a lower mid-section 152 extending between the lower end sections. The lower mid-section 152 is recessed with respect to the lower end sections 150. The exposed support block corner surface 70 that extends between the pair of exposed support block side surfaces 52, 54 has a lower corner section 172 aligned with the lower end sections 150 of the adjacent exposed support block side surfaces 52, 54 so as to protect the corner of the bottom deck 40.

The bottom deck 40 further includes a pair of elevated exterior ridges 162 adjacent each corner. Each elevated exterior ridge 162 contacts a corresponding lower mid-section 152 of an exposed support block side surface 52, 54.

One of the exposed bottom deck side surfaces 42 adjacent each corner includes an interior backstop 172 contacting an interior of one of the exposed support block side surfaces 52. Should the corner support block 50 be impacted with the times of a forklift on the exposed support block side surface 52, then the interior backstop 172 helps to absorb some of the impact. The interior backstop 172 is located on the short side of the corner support block 50.

Respective portions 182, 184, 185 of the exposed bottom deck side surfaces 42, 44 and the exposed bottom deck corner surface 45 are beveled or angled with respect to a bottom surface of the bottom deck.

Another aspect is directed to a method for making a pallet 20 with pockets 60 as described above. The method includes forming a top deck 30 having a rectangular shape, forming a bottom deck 40 having a rectangular shape, and forming a plurality of spaced apart corner support blocks 50 to be coupled between corners of the top and bottom decks and forming a gap therebetween for receiving a lifting member. Each corner support block 50 includes a pair of exposed support block side surfaces 52, 54 aligned with a respective corner, with each exposed support block side surface having a pocket 60 formed therein for receiving an end of the lifting member so as to allow the pallet to be spun around.

Figure 9:
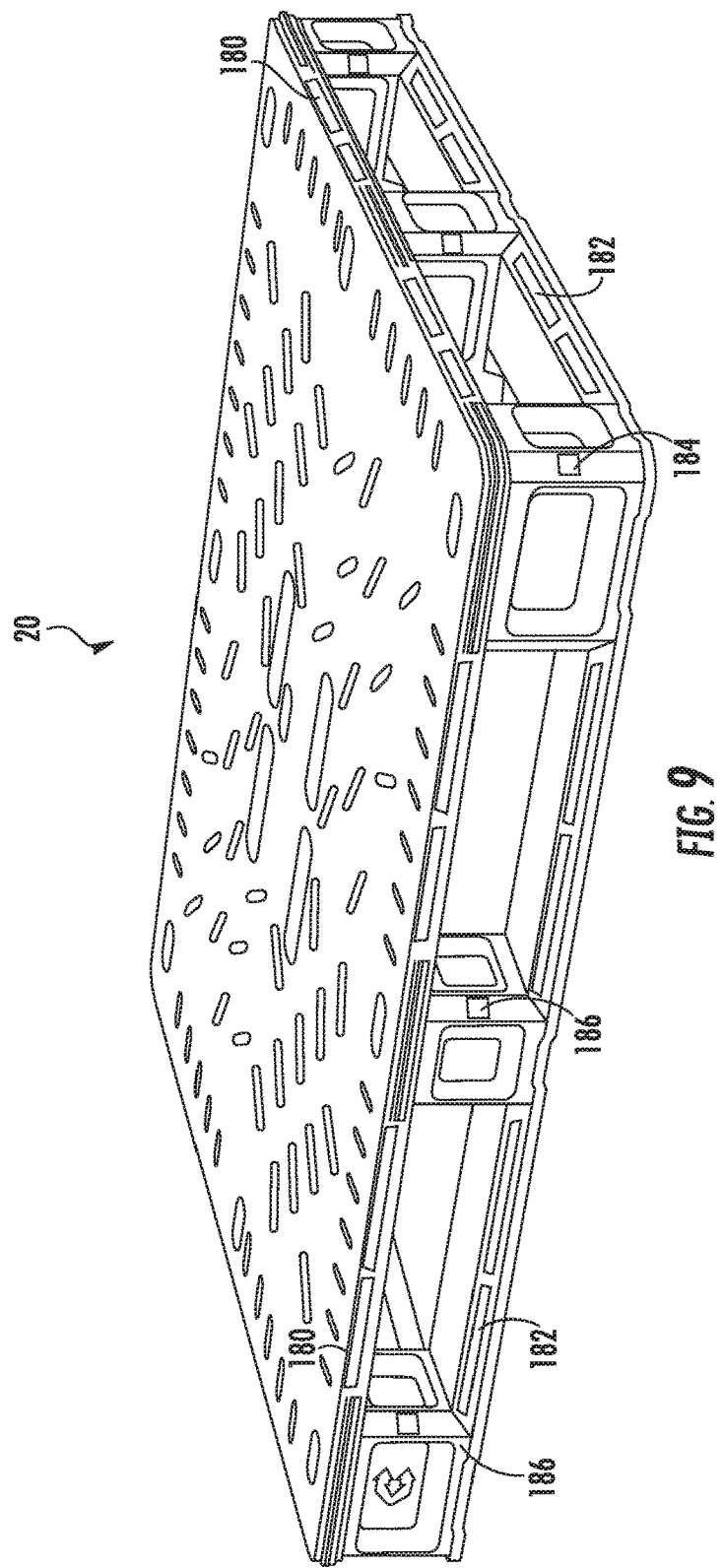
FIG. 9 is a perspective view of the plastic pallet shown in FIG. 1 with centerline markings.

The plastic pallet 20 with centerline markings 180, 182, 184 will now be discussed in reference to FIG. 9. The centerline markings 180, 182, 184 advantageously provide a visual aid to an operator of a forklift, for example, to better see the gaps or openings between the top and bottom decks 30, 40 of the plastic pallet 20. The visual aids on the plastic pallet 20 thus help to reduce impacts with the tines of the forklift.

The pallet 20 includes a top deck 30 having a rectangular shape with exposed outer edges 32, 34, and a bottom deck 40 having having a rectangular shape with exposed outer edges 42, 44. Spaced apart corner support blocks 50 are coupled between corners of the top and bottom decks 30, 40 and form a gap therebetween. The plastic pallet 20 further includes intermediate support blocks 80 coupled between mid-sections of the top and bottom decks 30, 40.

In the illustrated embodiment, the top deck 30 has centerline markings 180, the bottom deck 40 has centerline markings 182, and each corner support block 50 has centerline markings 184. In addition, each intermediate support block 80 has centerline markings 186.

In other embodiments, the plastic pallet 20 may include one or any combination of the centerline markings 180, 182, 184, 186, as readily appreciated by those skilled in the art. For example, the centerline markings 184, 186 are on the intermediate and corner support blocks 80, 50 and not on the top and bottom decks 30, 40. Alternatively, the centerline markings 180, 182 are on the top and bottom decks 30, 40 and not on the intermediate and corner support blocks 80, 50, as another example.

The centerline markings 180-186 preferably comprise a reflective and durable material. The centerline markings 180-186 may be applied in a number of different ways. For example, the centerline markings 180-186 may be painted, they may be pad printed, or they may be in the form of tape or stickers. In some applications the surfaces of the pallet 20 receiving the centerline markings 180-186 are recessed to increase durability.

The centerline markings 180-186 may also be applied during an in-line molding process. The centerline markings 180-186 are pre-molded with a lighter color plastic. The pre-molded centerline markings 180-186 are then placed in the respective molds when the top and bottom decks 30, 40 and the intermediate and corner support blocks 80, 50 are formed with a darker color plastic. The darker color plastic is contrasted with the lighter color plastic of the pre-molded centerline markings 180-186.

In the illustrated embodiment for the top deck 30, the exposed outer edges 32, 34 have centerline markings 180. Similarly, the exposed outer edges 42, 44 of the bottom deck 40 have centerline markings 182. The respective centerline markings extend between each corner support block 50 and an intermediate support block 80, as illustrated. As also illustrated, there is a gap or break in the centerline markings 180, 182 to indicate a center of the gap between an adjacent corner support block 50 and an intermediate support block 80.

Alternatively, the centerline markings 180, 182 may be continuous so as to not include such a gap. Moreover, the centerline markings 180, 182 may be continuous so as to extend across a width of the pallet 20, i.e., between corner support blocks 50.

With respect to the corner support blocks 50, the centerline markings 186 are carried by the exposed corner surface 170 extending between the pair of exposed side surfaces 52, 54. The centerline marking 186 may be positioned at a center of the exposed corner surface 170, as illustrated. Alternatively, the centerline marking 186 may be continuous along a length or height of the exposed corner surface 170. The continuous centerline marking may further include a gap or break to indicate a center of the corner support block 50.

The centerline markings 184 on the intermediate support block 80 are similar to the centerline markings on the corner support blocks 50. Each centerline marking 184 on the intermediate support block 80 is carried by an exposed support block corner surface 86.

Another aspect is directed to a method for making a pallet 20 with centerline markings 180, 182, 184, 186 as described above. The method includes forming a top deck 30 having a rectangular shape, forming a bottom deck 40 having a rectangular shape, and coupling a plurality of spaced apart corner support blocks 50 and a plurality of intermediate support blocks 80 between the top and bottom decks and forming a gap therebetween for receiving a lifting member. Centerline markings 180, 182, 184, 186 are attached to at least one of the top deck 30, the bottom deck 40, and the plurality of corner and intermediate support blocks 50, 80 so as to provide a visual aid to an operator of the lifting member.

Figure 10:
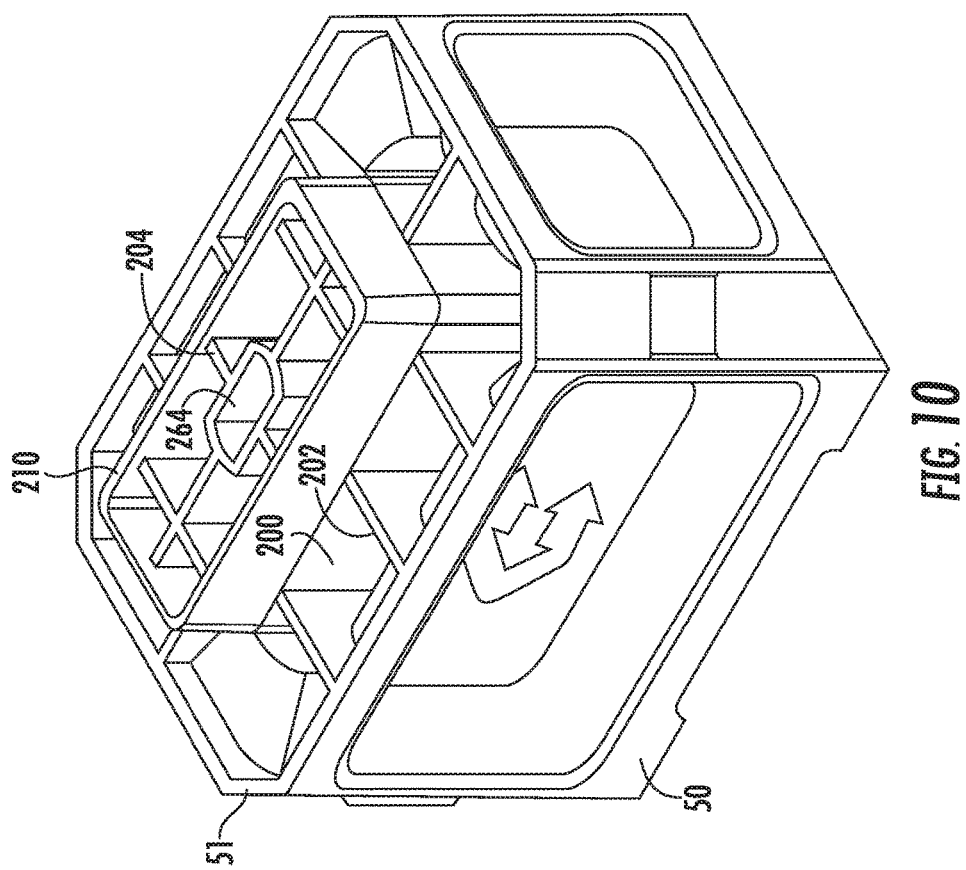
FIG. 10 is an upper perspective view of the corner support block shown in FIG. 1 with an upper tower extending therefrom.
Figure 11:
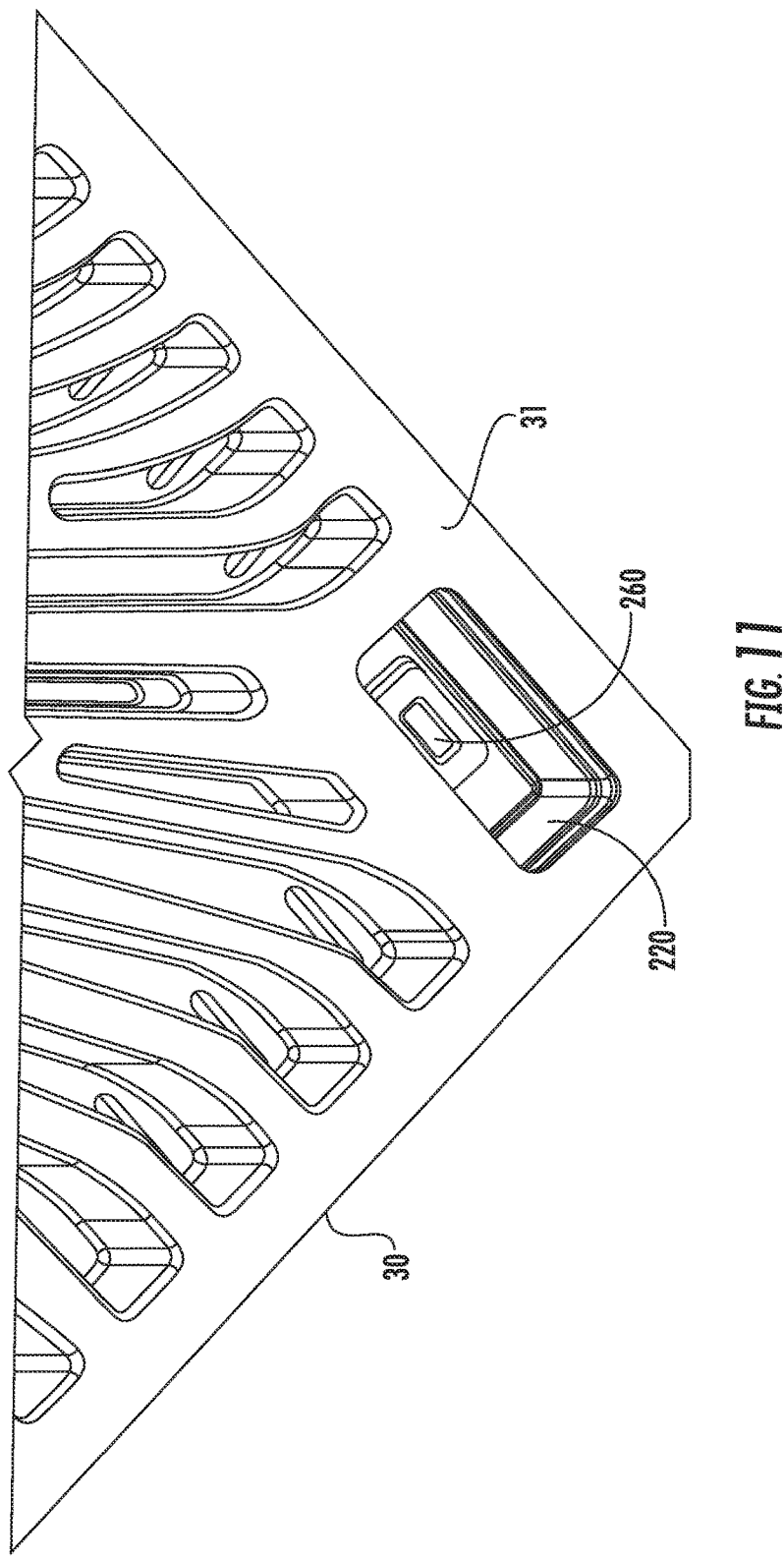
FIG. 11 is an enlarged perspective view of a corner of the top deck shown in FIG. 1 with an upper tower opening therein.

Referring now to FIGS. 10 and 11, another aspect of the plastic pallet 20 is directed to the corner support blocks 50 each having an upper tower 210 that is received by a corresponding upper tower opening 220 in the top deck 30. The upper tower 210 advantageously provides a shear load transfer during impact with the tines of a forklift or pallet jack. Likewise, the intermediate support blocks 80 also have upper towers. Discussion of the upper tower 210 for the corner support blocks 50 is also applicable to the intermediate support blocks 80.

The top deck 30 has a rectangular shape with spaced apart upper and lower surfaces. The lower surface 31 of the top deck 30 has a plurality of upper tower openings 220 therein.

Each corner support block 50 includes an outer wall 51 enclosing a center area, and a core structure 200 having a rectangular shape within the center area. Upper surfaces of the core structure 200 and the outer wall 51 are coplanar.

The upper tower 210 extends outwards from the core structure 200 and into a corresponding upper tower opening 220 in the top deck 30 so as to provide a shear load transfer during impact with the lifting member, for example. The core structure 200 and the upper tower 210 have a same size rectangular shape. In addition, the sidewalls of the core structure 200 are aligned with the sidewalls of the upper tower 210. Each support block 50 is formed as a monolithic or one-piece support block.

A first set of ribs 202 is between the outer wall 51 and the core structure 200. A second set of ribs 204 is within an interior area of the upper tower 210. The first and second set of ribs 202, 204 provide reinforcement to the corner support block 50 to improve impact performance.

Figure 12:
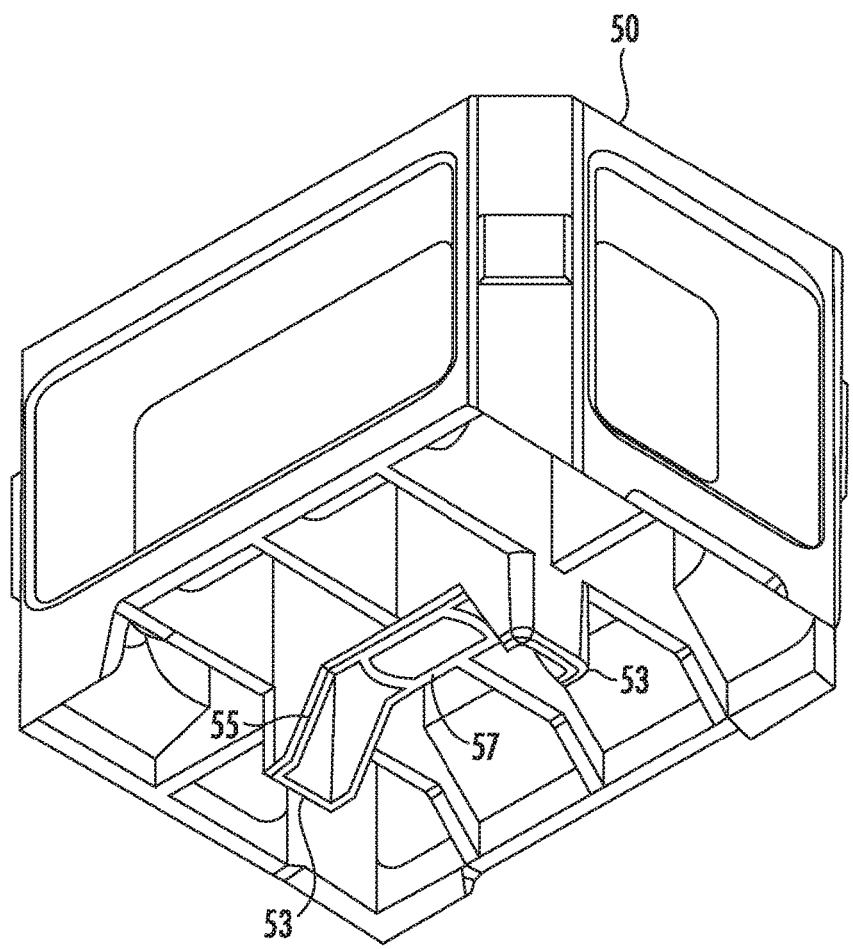
FIG. 12 is a lower perspective view of the corner support block shown in FIG. 1 with paired projections extending therefrom.
Figure 13:
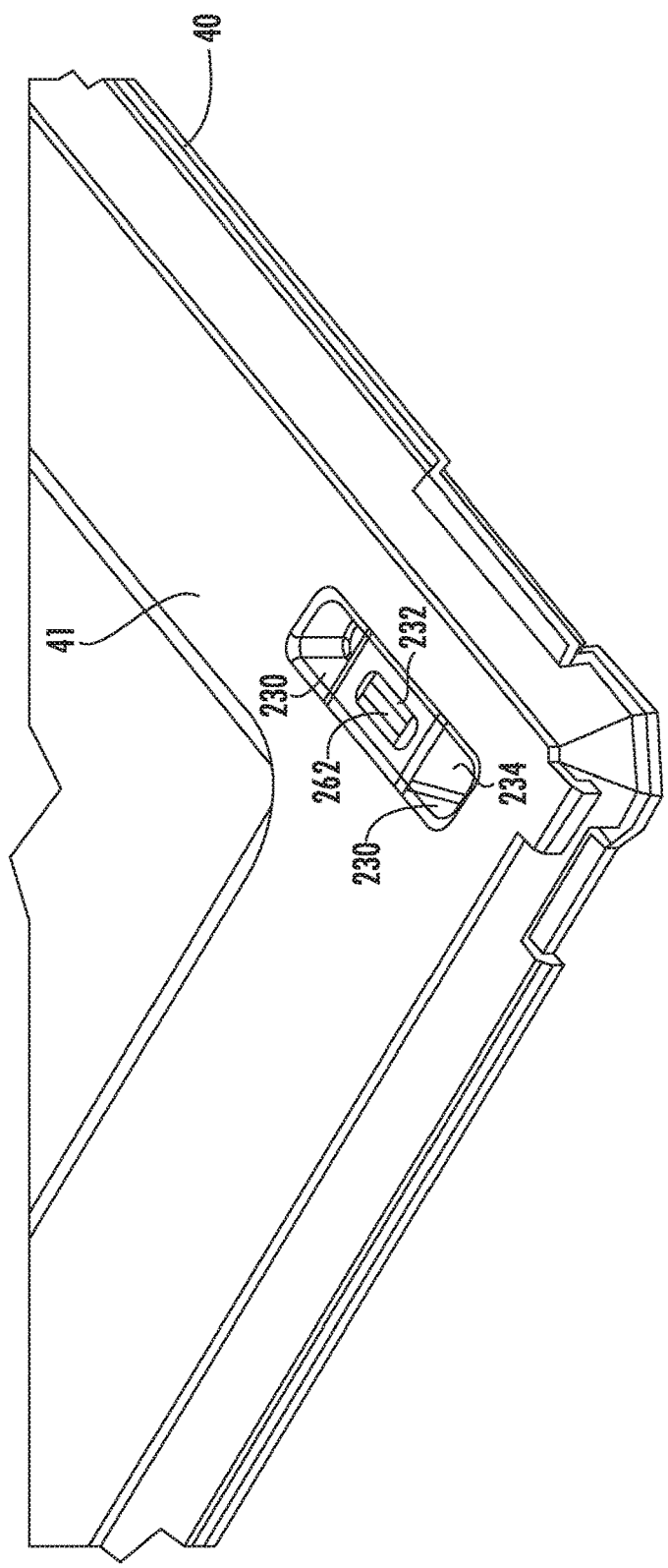
FIG. 13 is an enlarged perspective view of a corner of the bottom deck shown in FIG. 1 with paired projection openings therein.

Interface of the corner support blocks 50 to the bottom deck 40 will now be discussed in reference to FIGS. 12 and 13. The bottom deck 40 has spaced apart upper and lower surfaces, with the upper surface 41 having a plurality of paired projection openings 230 therein. The paired projection openings 230 are separated by a portion of the upper surface area 232 of the bottom deck 40. Each paired projection openings 230 is aligned with a corresponding upper tower opening 220 in the top deck 30.

Each corner support block 50 further includes paired projections 53 extending from a lower surface of the core structure 200 and into corresponding paired projection openings 230 in the bottom deck 40. The pair projections 53 are separated by a portion 57 of a bottom surface area of the core structure 200. The paired projections 53 also advantageously provide a shear load transfer during impact with the tines of a forklift or pallet jack.

Portions 234 of the paired projection openings 230 in the bottom deck 40 are tapered. Similarly, portions 55 of the paired projections 53 on the support blocks 50 are tapered as well. The tapered portions 234 of the paired projection openings 230 are angled towards the core structure 200, and the tapered portions 55 of the paired projections 53 are also angled towards the core structure. The tapered portions 55, 234 allow the paired projections 53 to be more easily inserted into the paired projection openings 230.

Figure 14:
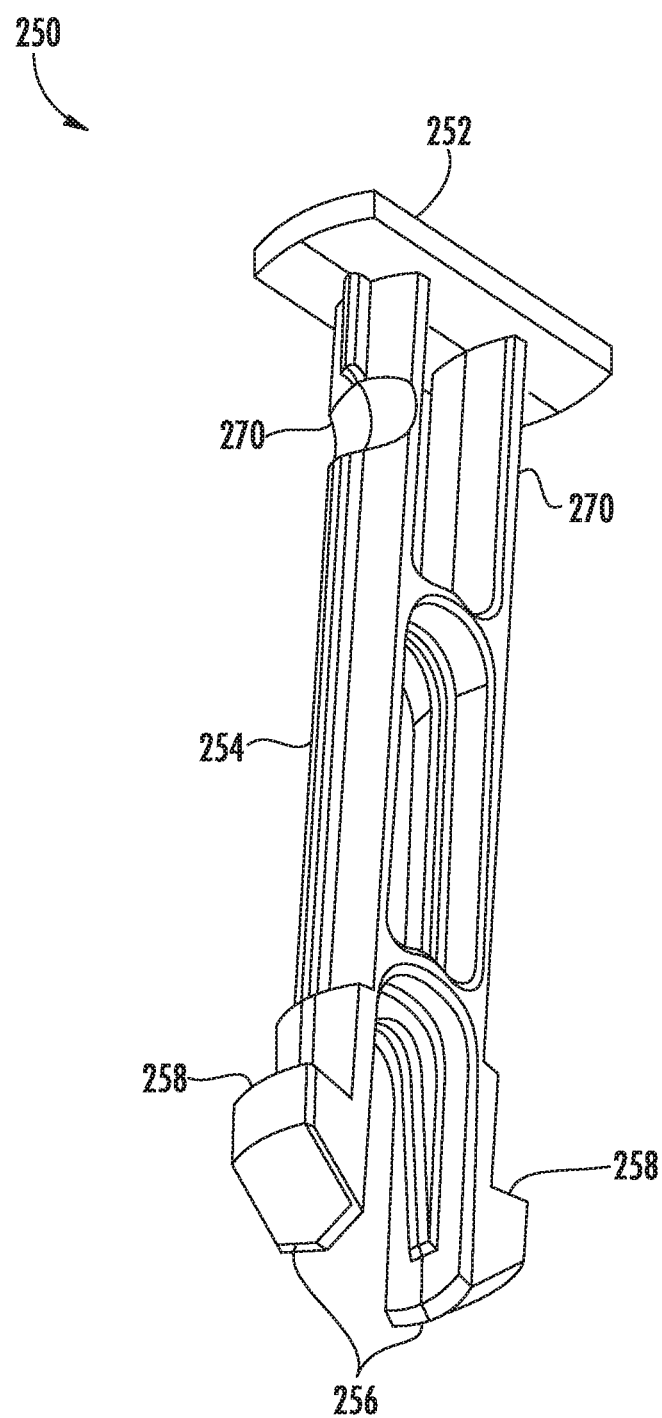
FIG. 14 is an enlarged perspective view of an underside of the plastic pallet shown in FIG. 1.
Figure 15:
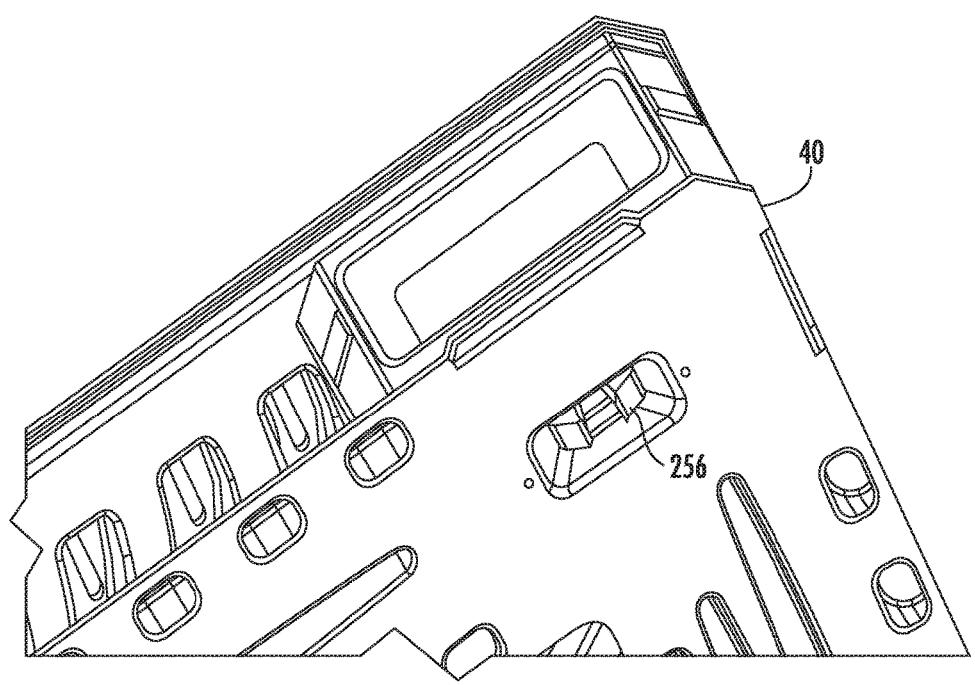
FIG. 15 is a perspective view of a snap-pin used in the plastic pallet shown in FIG. 1.

Once the top and bottom decks 30, 40 are joined with the corner and intermediate support blocks 50, 80, snap-pins 250 may be used to hold the pallet 20 together, as illustrated in FIGS. 14-15. A snap-pin 250 is inserted through each corner and intermediate support block 50, 80. An advantage of the snap-pins 250 is that they act as fusible links in the event an excessive separation force is applied between the top and bottom decks 30, 40.

This separation force may result when the wheels of a pallet jack are resting on the bottom deck 40, and the tines extending from the pallet jack are lifted upwards. This causes the top deck 30 to become separated from the lower deck 40. The snap-pins 250 will snap or break when the separation force becomes too excessive. Consequently, instead of replacing the entire top deck 30, the broken snap-pins 250 are replaced instead.

The top deck 30 has upper snap-pin openings 260 extending therethrough, as illustrated in FIG. 11. The bottom deck 40 has lower snap-pin openings 262 extending therethrough and aligned with the upper snap-pin openings 260, as illustrate in FIG. 13. More particularly, each upper snap-pin opening 260 extends through a corresponding upper tower opening 220 in the top deck 30. Each lower snap-pin opening 262 extends between corresponding paired projection openings 230 in the bottom deck 40.

The upper tower 210 in each corner support block 50 includes a snap-pin channel 264 extending therethrough and aligned with respective upper and lower snap-pin openings 260, 262 in the top and bottom decks 30, 40. The second set of ribs 204 contacts the snap-pin channel 264. Discussion of the snap-pins 250 for the corner support blocks 50 is also applicable to the intermediate support blocks 80.

Each snap-pin 250 comprises a headend 252 for engaging the upper snap-pin opening 260 in the top deck 30, a body 254 coupled to the headend and extending within the snap-pin channel 264, and a pair of spaced apart tips 256 coupled to the body and extending through the lower snap-pin opening 262 for resiliently engaging the lower surface of the bottom deck 40.

The body 254 includes a pair of notches 270 to intentionally weaken the snap-pin 250 so that when an excessive separation force is applied between the top and bottom decks 30, 40, the body snaps or breaks. The notches 270 are sized so that the body 254 will snap or break at a predetermined failure load, as readily appreciated by those skilled in the art.

The headend 252 of each snap-pin 250 may be rectangular shaped. Each snap-pin opening 260 in the upper deck 30 is correspondingly shaped the same. This helps to hold the snap-pins 250 in place. The snap-pins 250 are typically inserted into the pallet 20 after the upper and lower decks 30, 40 have been joined with the corner and intermediate support blocks 50, 80.

The spaced apart tips 256 of each snap-pin 250 may be angled to facilitate insertion thereof through the snap-pin receiving cavity 264. Each tip 256 has a respective lip 258 for engaging the backside of the bottom deck 40.

On the backside of the bottom deck 40, the lower snap-pin openings 262 are recessed. This is to allow room for the lips 258 on the tips 256 to clear and engage the backside of the bottom deck 40 without extending past the lower surface of the bottom deck, as illustrated in FIG. 15. Similarly, the upper snap-pin openings 260 in the top deck 30 are recessed. This allows clearance for the head 252 of each snap-pin 250 to engage an upper snap-pin opening 260 in the top deck 30 without extending past the upper surface of the top deck, as illustrated in FIG. 2.

Figure 16:
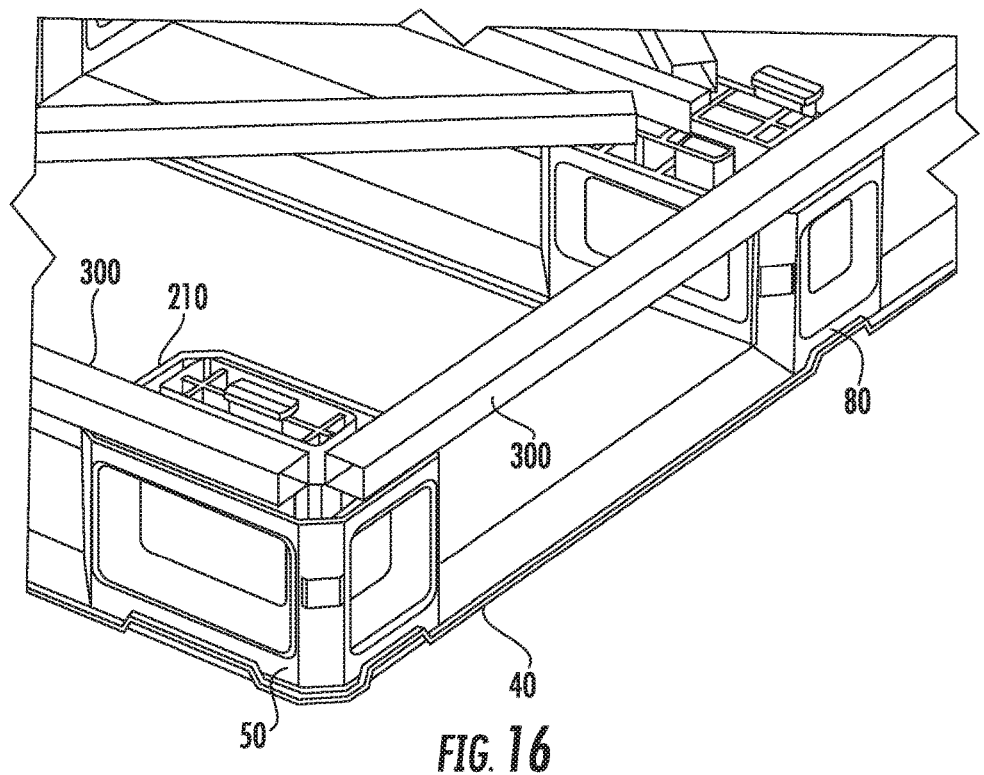
FIG. 16 is a partial cut-away perspective view of the plastic pallet shown in FIG. 1 with tubular inserts in the top deck.

The pallet 20 further includes a plurality of tubular inserts 300 carried by the top deck 30, as illustrated in FIG. 16. The tubular inserts 300 are along the perimeter of the top deck 30, as well as diagonally positioned within the area enclosed by the perimeter. The tubular inserts 300 are metal, and add strength and durability to the top deck 30. Although not illustrated, the bottom deck 40 also includes tubular inserts.

Figure 17:
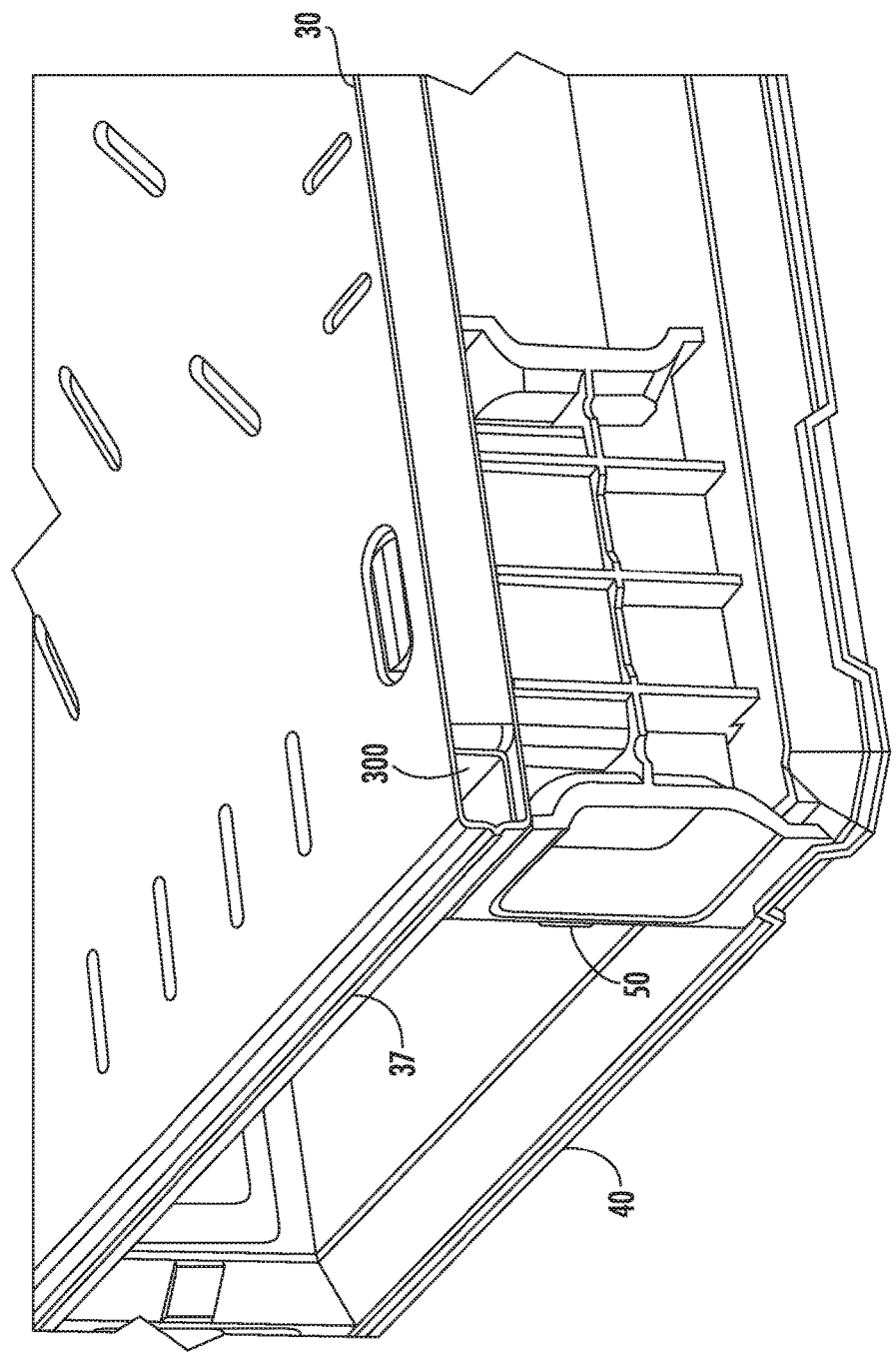
FIG. 17 is a cross-sectional view of a corner of the plastic pallet shown in FIG. 1 exposing a tubular insert in the top deck.

The tubular inserts 300 along the perimeter of the top deck 30 butt up against the upper towers 210 in the corner and intermediate support blocks 50, 80. The top deck 30 is formed in a twin sheet thermoforming process and has a thermoplastic upper sheet 31 which is fused to a thermoplastic lower sheet 33, as illustrated in FIG. 17. The upper sheet 31 and the lower sheet 33 thus have a fused seam 37 along the perimeter edges of the upper deck 30. The bottom deck 40 is also formed in a twin sheet thermoforming process.

Another aspect is directed to a method for making a pallet 20 with support blocks 50, 80 having an upper tower 210 as described above. The method includes forming a top deck 30 having a rectangular shape with spaced apart upper and lower surfaces, with the lower surface 31 having a plurality of upper tower openings 220 therein, and forming a bottom deck 40 having a rectangular. The method further includes coupling a plurality of spaced apart support blocks 50, 80 between the top and bottom decks 30, 40 and forming a gap therebetween for receiving a lifting member. Each support block 50, 80 includes an outer wall 51 enclosing a center area, and a core structure 200 having a rectangular shape within the center area, and with upper surfaces of the core assembly and the outer wall being coplanar. An upper tower 210 extends outwards from the core structure 200 and into a corresponding upper tower opening 220 in the top deck 30 so as to provide a shear load transfer during impact with the lifting member. First ribs 202 may be between the outer wall 51 and the core structure 200, and second ribs 204 may be within an interior area of the upper tower 210.

Figure 18:
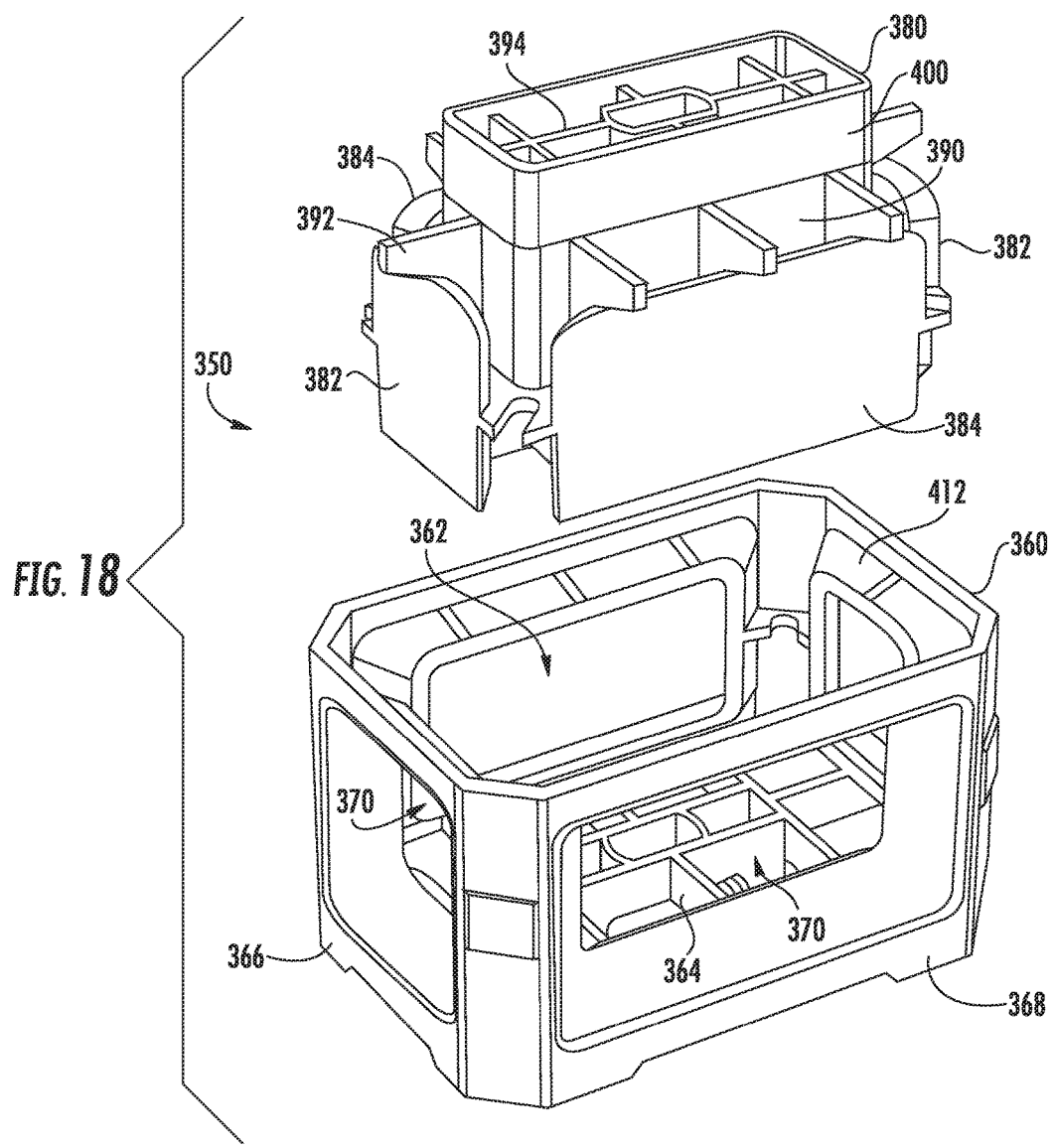
FIG. 18 is an exploded view of another embodiment of the support blocks shown in FIG. 1 with inner and outer blocks.
Figure 19:
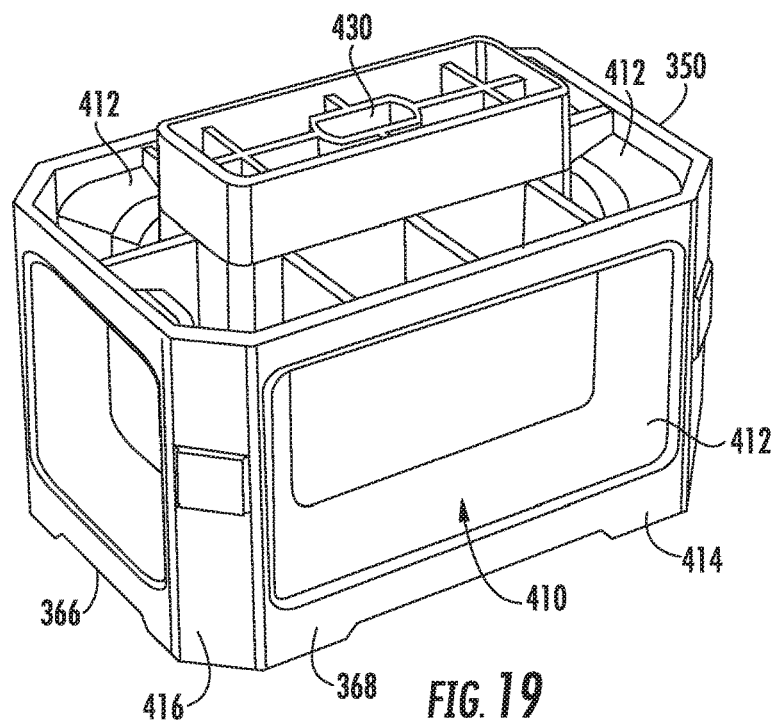
FIG. 19 is an upper perspective view of the support block shown in FIG. 18 with the upper and lower blocks joined together.
Figure 20:
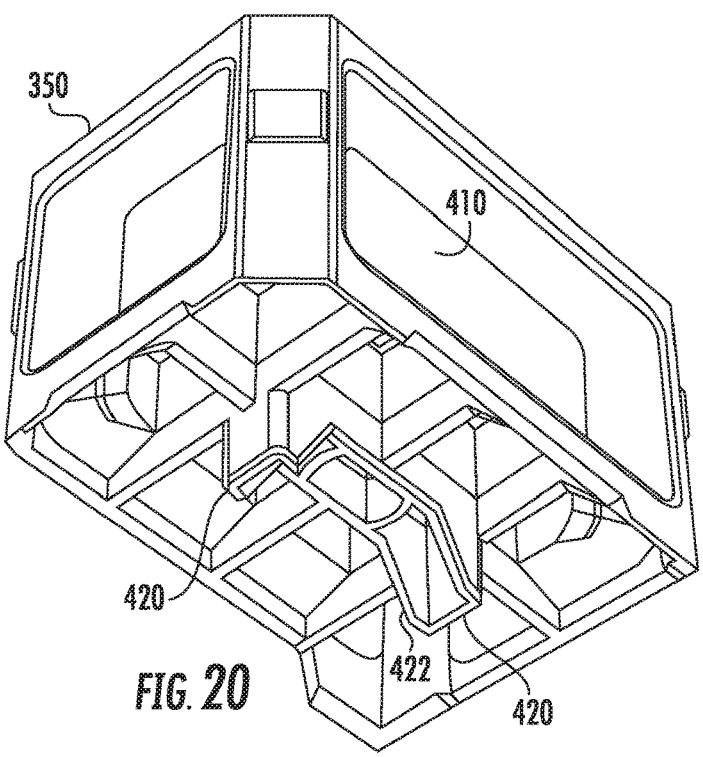
FIG. 20 is a lower perspective view of the support block shown in FIG. 18 with the upper and lower blocks joined together.
Figure 21:
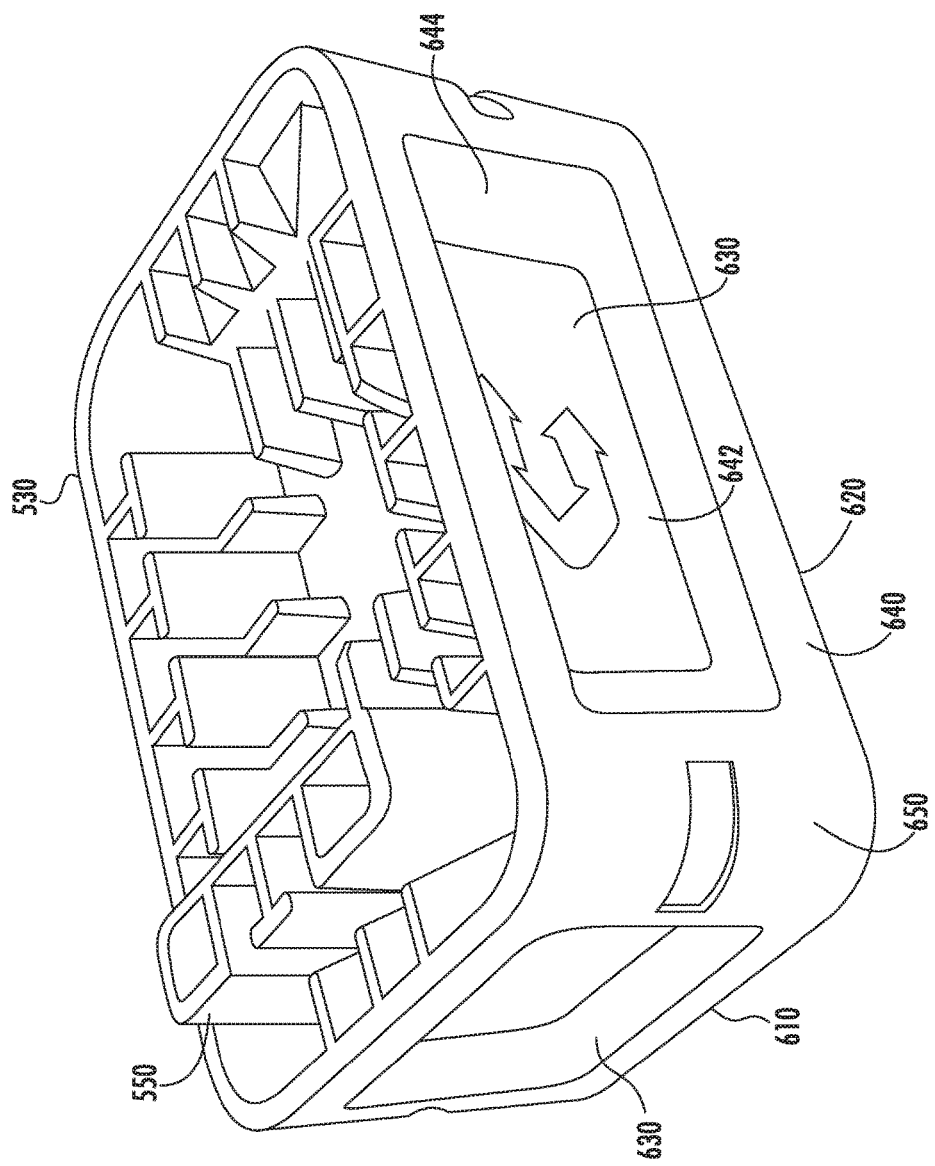
FIG. 21 is an upper perspective view of another embodiment of the support blocks shown in FIG. 1 with upper and lower towers.

Referring now to FIGS. 18-20, another embodiment of the support blocks 50, 80 is based on each support block 350 comprising separable inner and outer blocks 360, 380. If a support block 350 is damaged from impact with the tines of a forklift or pallet jack, then the inner block 380 or the outer block 350 may be replaced without having to replace the entire corner support block.

The outer block 360 has an open top surface exposing an inner block receiving area 362 therein, and having a bottom surface 364, and first and second pairs of opposing outer block side surfaces 366, 368 carried by the bottom surface. Each opposing outer block side surface 366, 368 has a pocket opening therein 370 for also exposing the inner block receiving area 362.

The inner block 380 is inserted into the inner block receiving area 362 of the outer block 360. The inner block 380 includes first and second pairs of opposing inner block side surfaces 382, 384, with each opposing inner block side surface aligned a pocket opening 370 in a corresponding outer block side surface 366, 368 so as to form a pocket 410 by covering the pocket opening.

The outer and inner blocks 360, 380 may be molded from thermoplastic or other polymer materials, including high density polyethylene (HDPE), polypropylene (PP), among other polymer materials. As may be appreciated by those skilled in the art, the polymer materials may be filled or unfilled and/or may include particulate or fibrous, natural or synthetic materials, among other features. For example, unfilled HDPE may provide improved impact strength, PP having strengtheners (i.e., long glass fibers) may provide improved structural properties, and unfilled PP with random copolymers may provide improved reinforcement qualities.

Each of the outer and inner blocks 360, 380 may be formed with the same thermoplastic or polymer material. Alternatively, the outer block 360 may be formed with a first type of thermoplastic or polymer material, and the inner block 380 may be formed with a second type of thermoplastic or polymer material.

The other embodiment support blocks, such as corner support blocks 50 and intermediate support blocks 80, and the snap pins 250 as discussed above, may also be formed using a thermoplastic or other polymer materials.

The first and second pairs of opposing inner block side surfaces 382, 384 of each inner block 380 enclose a center area. Each inner block 380 further includes a core structure 390 having a rectangular shape within the center area.

A first set of ribs 392 is between the first and second pairs of opposing inner block side surfaces outer 382, 384 and the core structure 390. A second set of ribs 394 is within an interior area of the core structure 390.

When the inner block 380 and the outer block 360 are joined together, the first set of ribs 392 extend past the first and second pairs of opposing inner block side surfaces outer 382, 384 so as to contact the outer block 360. More particularly, the first set of ribs 392 contact the adjacent side surfaces 412 of the pockets 410.

The top deck 30 has spaced apart upper and lower surfaces, with the lower surface 31 having a plurality of upper tower openings 220 therein, as illustrated in FIG. 11. Each inner block 380 further includes an upper tower 400 extending outwards from the core structure 390 and into a corresponding upper tower opening 220 in the top deck 30 so as to provide a shear load transfer during impact with the lifting member.

The core structure 390 and the upper tower 400 have a same size rectangular shape. The sidewalls of the core structure 390 and the upper tower 400 are aligned.

Each pocket 410 is recessed from adjacent outer edges of the top and bottom decks. Each outer block side surface 366, 368 having the pocket opening 370 formed therein includes an outer exposed wall 414 surrounding the pocket opening, and adjacent side surfaces 412 extending between the outer exposed wall and the pocket opening. The inner block side surface 382, 384 aligned with the pocket opening 370 forms a bottom surface of the pocket 410, with the adjacent side surfaces 412 being non-orthogonal with respect to the outer exposed wall 414 and the bottom surface.

Each outer block 360 includes a respective exposed support block corner surface 416 extending between an outer block side surface 366 in the first pair of opposing outer block side surfaces and an adjacent outer block side surface 368 in the second pair of outer block side surfaces.

The bottom deck 40 has spaced apart upper and lower surfaces, with the upper surface 41 having a plurality of paired projection openings 230 recessed therein. Each paired projection openings 230 is aligned with a corresponding upper tower opening 220 in the top deck 30. Each support block further includes paired projections 420 extending from a lower surface of the core structure 390 and into corresponding paired projection openings 230 in the bottom deck 40, as illustrated in FIG. 13.

Portions 234 of the paired projection openings 230 in the bottom deck 40 are tapered, and portions 422 of the paired projections 420 are tapered. The tapered portions 234 of the paired projection openings 230 are angled towards the core structure 390. Similarly, the tapered portions 422 of the paired projections 420 are angled towards the core structure 390.

The top deck 30 has a plurality of upper snap-pin openings 260 extending through the plurality of tower assembly openings 220, as illustrated in FIG. 11. Similarly, the bottom deck 40 has a plurality of lower snap-pin openings 262 extending therethrough and aligned with the plurality of upper snap-pin openings 260, as illustrated in FIG. 13. The upper tower 400 in each support block 350 includes a snap-pin channel 430 extending therethrough and aligned with respective upper and lower snap-pin openings 260, 262 in the top and bottom decks 30, 40. Snap-pins 250 are inserted into the snap-pin channels 430 as discussed above.

Another aspect is directed to a method for making a pallet 20 with support blocks 350 that include inner and outer blocks 360, 380 as described above. The method includes forming a top deck 30, forming a bottom deck 40, and coupling a plurality of spaced apart support blocks 350 between the top and bottom decks and forming a gap therebetween for receiving a lifting member. Each support block 350 includes an outer block 360 having an open top surface exposing an inner block receiving area 362 therein, and includes a bottom surface 364, and first and second pairs of opposing outer block side surfaces 366, 368 carried by the bottom surface. Each opposing outer block side surface 366, 368 has a pocket opening 370 therein for also exposing the inner block receiving area. An inner block 380 is inserted into the inner block receiving area 362 of the outer block 360, and includes first and second pairs of opposing inner block side surfaces 382, 384. Each opposing inner block side surface 382, 384 is aligned with a pocket opening 370 in a corresponding outer block side surface 366, 368 so as to form a pocket 410 by covering the pocket opening.

Another embodiment of the above described pallet 20 will now be discussed in reference to FIGS. 21-27. In this embodiment, the plastic pallet 500 includes support blocks 530 with upper and lower towers 550, 570, and interlocking tower assemblies 590 extending through the support blocks 530 for coupling the top and bottom decks 510, 520 together.

Figure 22:
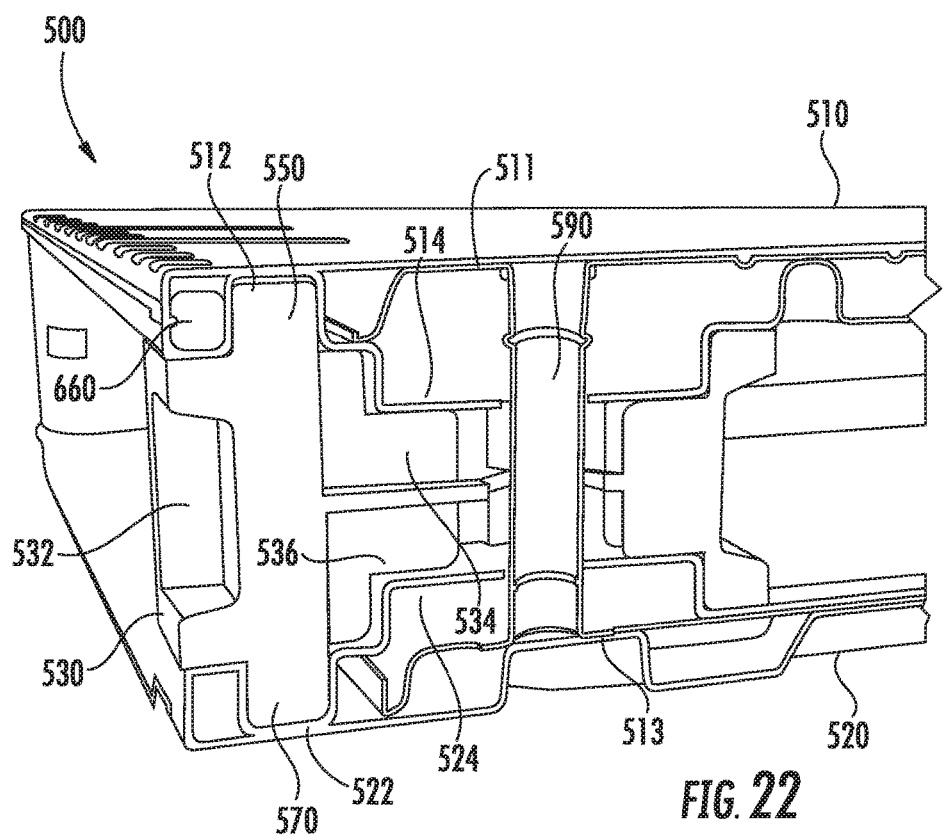
FIG. 22 is a cross-sectional view of a pallet with the support block shown in FIG. 21.

A cross-sectional view of the pallet 500 through a center of a support block 530 is provided in FIG. 22. The top deck 510 has a rectangular shape with spaced apart upper and lower surfaces, with the lower surface having a plurality of upper tower openings 512 recessed therein and a plurality of stepped upper projections 514 projecting therefrom. Each stepped upper projection 514 is adjacent a respective upper tower opening 512 so as to form a top deck upper stepped interface.

Similarly, the bottom deck 520 has a rectangular shape with spaced apart upper and lower surfaces, with the upper surface having a plurality of lower tower openings 522 recessed therein and a plurality of stepped lower projections 524 projecting therefrom. Each stepped lower projection 524 is adjacent a respective lower tower opening 522 so as to form a bottom deck lower stepped interface.

Spaced apart support blocks 530 are coupled between the top and bottom decks 510, 520 and form a gap therebetween for receiving a lifting member. The support blocks 530 may be configured as corner support blocks or intermediate support blocks. Each support block 530 includes a mid-section 532 having spaced apart upper and lower surfaces.

An upper tower 550 extends from the upper surface of the mid-section 532. The upper surface has a stepped upper projection recess 534 adjacent to the upper tower 550 so as to form a support block upper stepped interface. The upper tower 550 is inserted into a corresponding upper tower recess 512 in the top deck 510, while the stepped upper tower projection recess 534 receives a corresponding stepped upper tower projection 514 from the top deck 510 so that the top deck upper stepped interface contacts the support block upper stepped interface so as to provide a shear load transfer during impact with the lifting member.

A lower tower 570 extends from the lower surface of the mid-section 532. The lower surface has a stepped lower projection recess 536 adjacent to the lower tower 570 so as to form a support block lower stepped interface. The lower tower 570 is inserted into a corresponding lower tower recess 522 in the bottom deck 520, while the stepped lower tower projection recess 536 receives a corresponding stepped lower tower projection 524 from the bottom deck 520 so that the bottom deck lower stepped interface contacts the support block lower stepped interface so as to provide a shear load transfer during impact with the lifting member.

The pallet 500 further includes interlocking tower assemblies 590 extending between the top and bottom decks 510, 520 and through the support blocks 530. Each interlocking tower assembly 590 includes a tubular section 592 carried by the bottom deck 520 and having an end 594 contacting the lower surface of the top deck 520. The end 594 may be straight, or flared as illustrated. An insert 602 is carried by the top deck 510 and has a tapered end 604 inserted into the end 594 of the tubular section 592.

Figure 23:
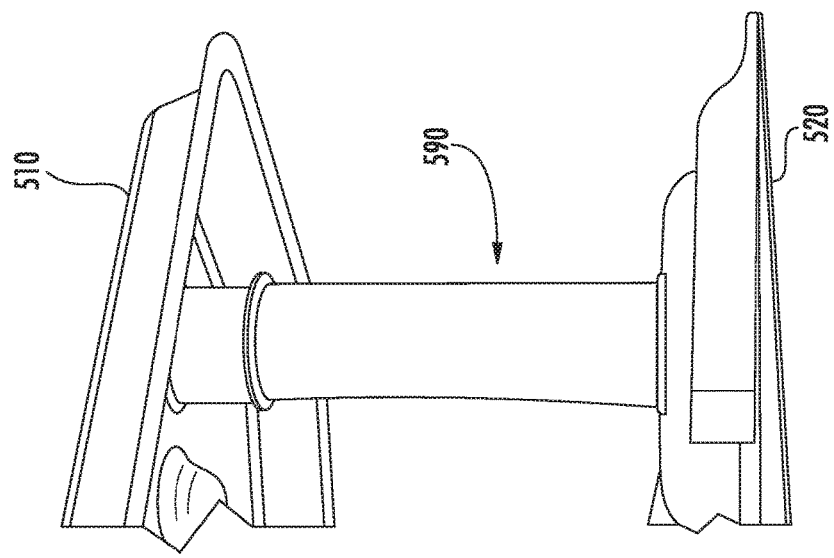
FIG. 23 is a perspective view of a corner of the pallet shown in FIG. 22 without the support block to show an interlocking tower assembly that extends through the support block.

The tubular section 592 includes a biasing member 596, and the insert 602 includes a catch 606 that engages the biasing member. The illustrated biasing member 596 is a spring, and the catch 606 is a groove along sidewalls of the insert 602. The spring 596 releases the groove 606 at a predetermined load The interlocking tower assembly 590 coupling the top and bottom decks 510, 520 together is illustrated in FIG. 23 without the support block 530 in place. Sheet metal 511 carried by the top deck 510 is used to secure the insert 602 to the top deck 510, and sheet metal 511 carried by the bottom deck 520 is used to secure the tubular section 592 to the bottom deck 520, as illustrated in FIGS. 23 and 24.

Figure 24:
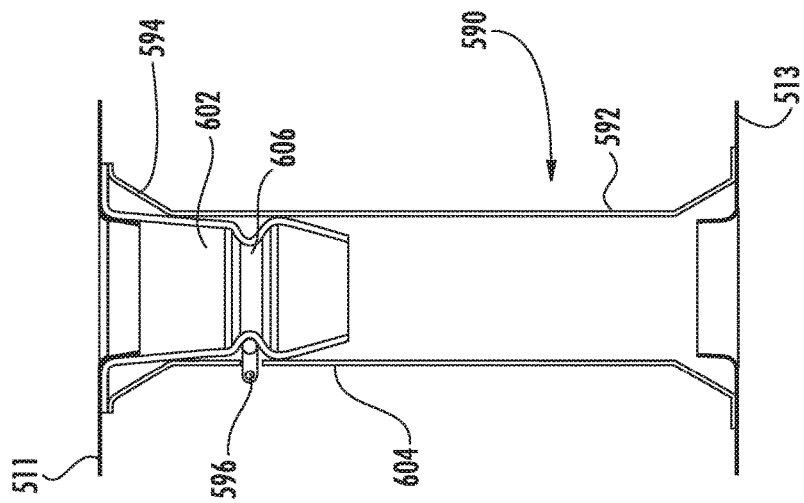
FIG. 24 is a cross-sectional view of the interlocking tower assembly shown in FIG. 22 fully seated.
Figure 25:
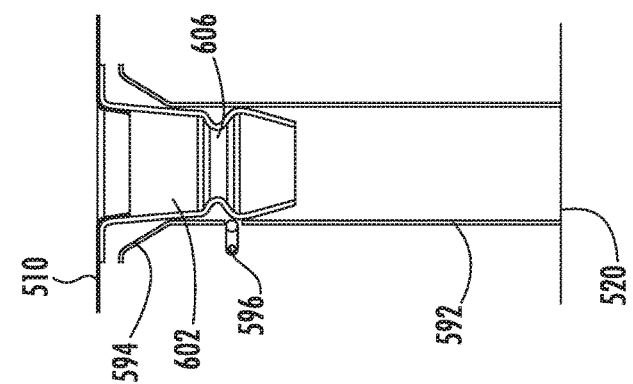

As shown in FIG. 24, the insert 602 is fully seated in the tubular section 592. When the tines of the pallet jack are inserted too far between the top and bottom decks 510, 520 such that the wheels of the pallet jack are resting on the bottom deck, then the bias member 596 in the tubular section starts to separate from the catch 606 in the insert 602 as force is applied, as illustrated in FIG. 25.

Figure 27:
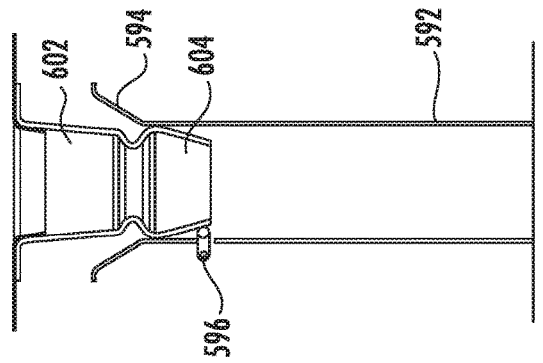
FIGS. 25-27 are cross-sectional views of the interlocking tower assembly shown in FIG. 22 at different stages of not being fully seated.
Figure 26:
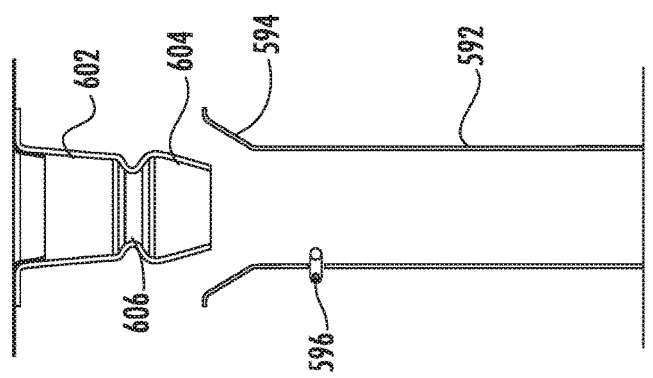

Once the bias member 596 clears the catch 606, then the top deck 510 is separated from the bottom deck 520, as illustrated in FIG. 26. To reset the connection, the tapered end 604 of the insert 602 is inserted into the flared end 594 of the tubular section 592, as illustrated in FIG. 27. This configuration advantageously provides a consistent resetting.

The mid-section of each support block 532 includes first and second pairs of opposing exposed support block side surfaces 610, 620. Each exposed support block side surface 610, 620 has a pocket 630 formed therein for receiving an end of the lifting member so as to allow the pallet to be spun around. Each pocket 630 is recessed from adjacent outer edges of the top and bottom decks 510, 520.

Each exposed support block side surface 610, 620 having the pocket 630 formed therein includes an outer exposed wall 640 surrounding the pocket. The pocket 630 includes a bottom surface 642 and adjacent side surfaces 644, with the adjacent side surfaces being non-orthogonal with respect to the outer exposed wall and the bottom surface.

The mid-section 532 of each support block comprises a respective exposed support block corner surface 650 extending between an exposed support block side surface 610 in the first pair of exposed support block side surfaces and an adjacent exposed support block side surface 620 in the second pair of exposed support block side surfaces.

The pallet 500 further includes tubular inserts 660 carried by the top deck 510 along outer edges thereof. Each tubular insert 660 butts up against at least one upper tower 550.

Another aspect is directed to a method for making a pallet 20 with support blocks 530 with upper and lower towers 550, 570 as described above. The method includes forming a top deck 510 having a rectangular shape and forming a bottom deck 520 having a rectangular shape. The top deck 510 includes spaced apart upper and lower surfaces, with the lower surface having a plurality of upper tower openings 512 recessed therein and a plurality of stepped upper projections 514 projecting therefrom. Each stepped upper projection 514 includes is adjacent a respective upper tower opening 512 so as to form a top deck upper stepped interface.

The bottom deck 520 includes spaced apart upper and lower surfaces, with the upper surface having a plurality of lower tower openings 522 recessed therein and a plurality of stepped lower projections 524 projecting therefrom. Each stepped lower projection 524 is adjacent a respective lower tower opening 522 so as to form a bottom deck lower stepped interface.

The method further includes forming a plurality of spaced apart support blocks 530 between the top and bottom decks 510, 520 and forming a gap therebetween for receiving a lifting member. Each support block 530 includes a mid-section 532 having spaced apart upper and lower surfaces, and an upper tower 550 extending from the upper surface of the mid-section 532. The upper surface may have a stepped upper projection opening 534 adjacent to the upper tower 550 so as to form a support block upper stepped interface. The upper tower 550 may be inserted into a corresponding upper tower opening 512 in the top deck 510, while the stepped upper tower projection opening 534 receives a corresponding stepped upper tower projection 514 from the top deck 510 so that the top deck upper stepped interface contacts the support block upper stepped interface so as to provide a shear load transfer during impact with the lifting member.

A lower tower 570 extends from the lower surface of the mid-section 532, and with the lower surface having a stepped lower projection opening 536 adjacent to the lower tower 570 so as to form a support block lower stepped interface. The lower tower 570 is inserted into a corresponding lower tower opening 522 in the bottom deck 520, while the stepped lower tower projection opening 536 receives a corresponding stepped lower tower projection 524 from the bottom deck 520 so that the bottom deck lower stepped interface contacts the support block lower stepped interface so as to provide a shear load transfer during impact with the lifting member.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed:

1. A pallet comprising:
   a top deck having a rectangular shape;
   a bottom deck having having a rectangular shape;
   a plurality of spaced apart corner support blocks and a plurality of intermediate support blocks coupled between said top and bottom decks and forming a gap therebetween for receiving a lifting member; and
   a plurality of centerline markings carried by at least one of said top deck, said bottom deck, and said plurality of corner and intermediate support blocks so as to provide a visual aid to an operator of the lifting member, with each centerline marking comprising a pre-molded plastic having a first color surrounded by molded plastic having a second color, with the first color being lighter than the second color.

2. The pallet according to claim 1 wherein each centerline marking comprises a reflective material.

3. The pallet according to claim 1 wherein each centerline marking comprises a taped centerline marking.

4. The pallet according to claim 1 wherein each centerline marking comprises a painted centerline marking.

5. The pallet according to claim 1 wherein each centerline marking comprises a pad printed centerline marking.

6. The pallet according to claim 1 wherein each centerline marking is recessed with respect to a mounting surface on at least one of said top deck, said bottom deck, and said plurality of intermediate and corner support blocks having the plurality of centerline markings.

7. The pallet according to claim 1 wherein said top and bottom decks each have outer exposed edges, and wherein said plurality of centerline markings comprise centerline markings on the outer edges, with said centerline markings extending on the outer edges between said plurality of corner support blocks and said plurality of intermediate support blocks.

8. The pallet according to claim 1 wherein each corner and intermediate support block comprises first and second pairs of opposing exposed support block side surfaces, with each exposed support block side surface having a pocket formed therein for receiving an end of the lifting member so as to allow the pallet to be spun around.

9. A plastic pallet comprising:
a top deck;
a bottom deck; and
a plurality of spaced apart corner support blocks and a plurality of intermediate support blocks coupled between said top and bottom decks and forming a gap therebetween for receiving a lifting member, each corner and intermediate support block comprising
first and second pairs of opposing exposed support block side surfaces,
a respective exposed support block corner surface extending between an exposed support block side surface in the first pair of exposed support block side surfaces and an adjacent exposed support block side surface in the second pair of exposed support block side surfaces; and
a plurality of centerline markings carried by a plurality of said exposed support block corner surfaces so as to provide a visual aid to an operator of the lifting member.

10. The plastic pallet according to claim 9 wherein each centerline marking comprises a reflective pad printed centerline marking.

11. The plastic pallet according to claim 9 wherein each centerline marking comprises pre-molded plastic having a first color surrounded by molded plastic having a second color, with the first color being lighter than the second color.

12. A method for making a pallet comprising:
forming a top deck having having a rectangular shape;
forming a bottom deck having having a rectangular shape;
coupling a plurality of spaced apart corner support blocks and a plurality of intermediate support blocks coupled between the top and bottom decks and forming a gap therebetween for receiving a lifting member; and
providing a plurality of centerline markings to at least one of the top deck, the bottom deck, and the plurality of corner and intermediate support blocks so as to provide a visual aid to an operator of the lifting member, with each centerline marking comprising a pre-molded plastic having a first color surrounded by molded plastic having a second color, with the first color being lighter than the second color.

13. The method according to claim 12 wherein each centerline marking comprises a reflective pad printed centerline marking.

14. A pallet comprising:
a top deck having a rectangular shape;
a bottom deck having having a rectangular shape;
a plurality of spaced apart corner support blocks and a plurality of intermediate support blocks coupled between said top and bottom decks and forming a gap therebetween for receiving a lifting member; and
a plurality of centerline markings carried by at least one of said top deck, said bottom deck, and said plurality of corner and intermediate support blocks so as to provide a visual aid to an operator of the lifting member;
said top and bottom decks each having outer exposed edges, with said plurality of centerline markings comprising centerline markings on the outer edges, and with said centerline markings extending on the outer edges between said plurality of corner support blocks and said plurality of intermediate support blocks.

15. The pallet according to claim 14 wherein each centerline marking comprises a reflective material.

16. The pallet according to claim 14 wherein each centerline marking comprises a taped centerline marking.

17. The pallet according to claim 14 wherein each centerline marking comprises a painted centerline marking.

18. The pallet according to claim 14 wherein each centerline marking comprises a pad printed centerline marking.

19. The pallet according to claim 14 wherein each centerline marking is recessed with respect to a mounting surface on at least one of said top deck, said bottom deck, and said plurality of intermediate and corner support blocks having the plurality of centerline markings.

20. A method for making a pallet comprising:
forming a top deck having having a rectangular shape;
forming a bottom deck having having a rectangular shape;
coupling a plurality of spaced apart corner support blocks and a plurality of intermediate support blocks coupled between the top and bottom decks and forming a gap therebetween for receiving a lifting member; and
providing a plurality of centerline markings to at least one of the top deck, the bottom deck, and the plurality of corner and intermediate support blocks so as to provide a visual aid to an operator of the lifting member, the top and bottom decks each having outer exposed edges, with the plurality of centerline markings comprising centerline markings on the outer edges, and with the centerline markings extending on the outer edges between the plurality of corner support blocks and the plurality of intermediate support blocks.

21. The method according to claim 20 wherein each centerline marking comprises a reflective pad printed centerline marking.

* * * * *